(12) United States Patent
Fujikawa

(10) Patent No.: US 10,671,859 B2
(45) Date of Patent: Jun. 2, 2020

(54) TRAVEL ASSISTANCE DEVICE AND TRAVEL ASSISTANCE METHOD USING TRAVEL ASSISTANCE DEVICE

(71) Applicant: FUJIFILM Corporation, Tokyo (JP)

(72) Inventor: Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 15/915,963

(22) Filed: Mar. 8, 2018

(65) Prior Publication Data
US 2018/0197022 A1 Jul. 12, 2018

Related U.S. Application Data

(63) Continuation of application No. PCT/JP2016/004052, filed on Sep. 6, 2016.

(30) Foreign Application Priority Data

Sep. 11, 2015 (JP) .................................. 2015-179506

(51) Int. Cl.
*H04N 5/232* (2006.01)
*H04N 5/272* (2006.01)
(Continued)

(52) U.S. Cl.
CPC ............ *G06K 9/00798* (2013.01); *B60R 1/00* (2013.01); *G06K 9/00369* (2013.01);
(Continued)

(58) Field of Classification Search
CPC .... H04N 5/2254; H04N 5/2258; H04N 5/232; H04N 5/23229; H04N 5/247;
(Continued)

(56) References Cited

U.S. PATENT DOCUMENTS

2004/0091133 A1\* 5/2004 Monji ................ G06K 9/00798
382/104
2010/0250064 A1 9/2010 Ota et al.
(Continued)

FOREIGN PATENT DOCUMENTS

JP 4-205320 A 7/1992
JP 2001-101596 A 4/2001
(Continued)

OTHER PUBLICATIONS

Japanese Office Action dated Dec. 18, 2018, for Japanese Patent Application No. 2018-019517, with English translation.
(Continued)

*Primary Examiner* — Leron Beck
*Assistant Examiner* — Samuel D Fereja
(74) *Attorney, Agent, or Firm* — Birch, Stewart, Kolasch & Birch, LLP

(57) ABSTRACT

Present disclosure provides a travel assistance device which comprises: a road detection unit that obtains an infrared image in front of a vehicle from an infrared imaging unit that is mounted on the vehicle, and detects a road end line of a road on which the vehicle travels from the captured infrared image; a division line detection unit that obtains a visible image in a range corresponding to a range indicated by the infrared image from a visible imaging unit that is mounted on the vehicle, and detects a division line of the road from the captured visible image; an image generation unit that generates an integrated image indicating the road end line and the division line on the basis of the infrared image and the visible image registered with each other; and a division line estimation unit.

19 Claims, 14 Drawing Sheets

(51) Int. Cl.
- *G06K 9/00* (2006.01)
- *H04N 7/18* (2006.01)
- *G08G 1/0962* (2006.01)
- *G08G 1/16* (2006.01)
- *G06T 7/12* (2017.01)
- *G06T 7/174* (2017.01)
- *G06K 9/20* (2006.01)
- *B60R 1/00* (2006.01)
- *H04N 5/33* (2006.01)
- *G06K 9/62* (2006.01)

(52) U.S. Cl.
CPC ....... *G06K 9/00805* (2013.01); *G06K 9/2018* (2013.01); *G06T 7/12* (2017.01); *G06T 7/174* (2017.01); *G08G 1/0962* (2013.01); *G08G 1/166* (2013.01); *G08G 1/167* (2013.01); *H04N 5/33* (2013.01); *H04N 7/18* (2013.01); *H04N 7/183* (2013.01); *B60R 2300/108* (2013.01); *B60R 2300/307* (2013.01); *B60R 2300/804* (2013.01); *G06K 9/6293* (2013.01); *G06T 2207/10024* (2013.01); *G06T 2207/10048* (2013.01); *G06T 2207/30256* (2013.01)

(58) Field of Classification Search
CPC ........ H04N 5/272; H04N 7/181; H04N 7/188; H04N 9/07; G05D 1/0246; G05D 2201/0213; G05D 1/0088; G05D 1/0251; G05D 1/0253; G05D 1/0274; G05D 1/0061; G05D 1/0214; G05D 1/0221; G05D 1/0223; G05D 1/0257; G05D 1/0278; G05D 1/0212; G05D 1/0219; G05D 1/0225; G05D 1/027; G05D 1/0272; G05D 1/0287; G01S 13/931; G01S 2013/9342; G01S 11/12; G01S 13/867; G01S 2013/9321; G01S 2013/9346; G01S 2013/935; G01S 2013/9357; G01S 2013/936; G01S 2013/9375; G01S 13/723; G01S 13/87; G01S 17/023; G01S 17/89; G01S 17/936; G01S 2013/9325; G01S 2013/9353; G01S 13/86; G01S 13/865; G01S 19/10; G01S 19/13; G01S 19/17; G01S 19/41; G01S 19/42; G01S 19/50; G01S 2007/4975; G01S 2013/9332; G01S 2013/9339; G01S 2013/9378; G01S 2013/9382; G01S 5/16; G02B 2027/0138; G02B 2027/014; G02B 27/01; G02B 27/0101; G02B 2027/0141; G02B 19/0009; G02B 19/0014; G02B 19/0033

See application file for complete search history.

(56) References Cited

U.S. PATENT DOCUMENTS

| | | | |
|---|---|---|---|
| 2011/0007162 A1* | 1/2011 | Haug | G06K 9/00791 348/148 |
| 2011/0261168 A1 | 10/2011 | Shima et al. | |
| 2015/0145996 A1 | 5/2015 | Watanabe et al. | |
| 2017/0300764 A1* | 10/2017 | Kakegawa | G06T 1/00 |
| 2018/0197022 A1 | 7/2018 | Fujikawa | |

FOREIGN PATENT DOCUMENTS

| | | | |
|---|---|---|---|
| JP | 2001101596 A | * | 4/2001 |
| JP | 2003-67752 A | | 3/2003 |
| JP | 2004-104646 A | | 4/2004 |
| JP | 2005-316607 A | | 11/2005 |
| JP | 2006-185406 A | | 7/2006 |
| JP | 2008-158672 A | | 7/2008 |
| JP | 2010-128949 A | | 6/2010 |
| JP | 2010-221909 A | | 10/2010 |
| JP | 4584277 B2 | | 11/2010 |
| JP | 2014-85920 A | | 5/2014 |
| JP | 6291144 B2 | | 3/2018 |
| WO | WO 2013/171962 A1 | | 11/2013 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/004052, dated Mar. 22, 2018, with English translation.
International Search Report (Form PCT/ISA/210) for International Application No. PCT/JP2016/004052, dated Nov. 15, 2016, with English translation.
Mitsui et al., "Preceding Vehicle Detection by Far-Infrared and Conventional Video Image Sequence Processing," The Journal of the Institute of Image Electronics Engineers of Japan, vol. 24, No. 1, Feb. 25, 1995, pp. 2-9 (11 pages), with English summary.
Japanese Notice of Reasons for Refusal dated Jul. 2, 2019 for Japanese Patent Application No. 2018-019517, with English translation.

* cited by examiner

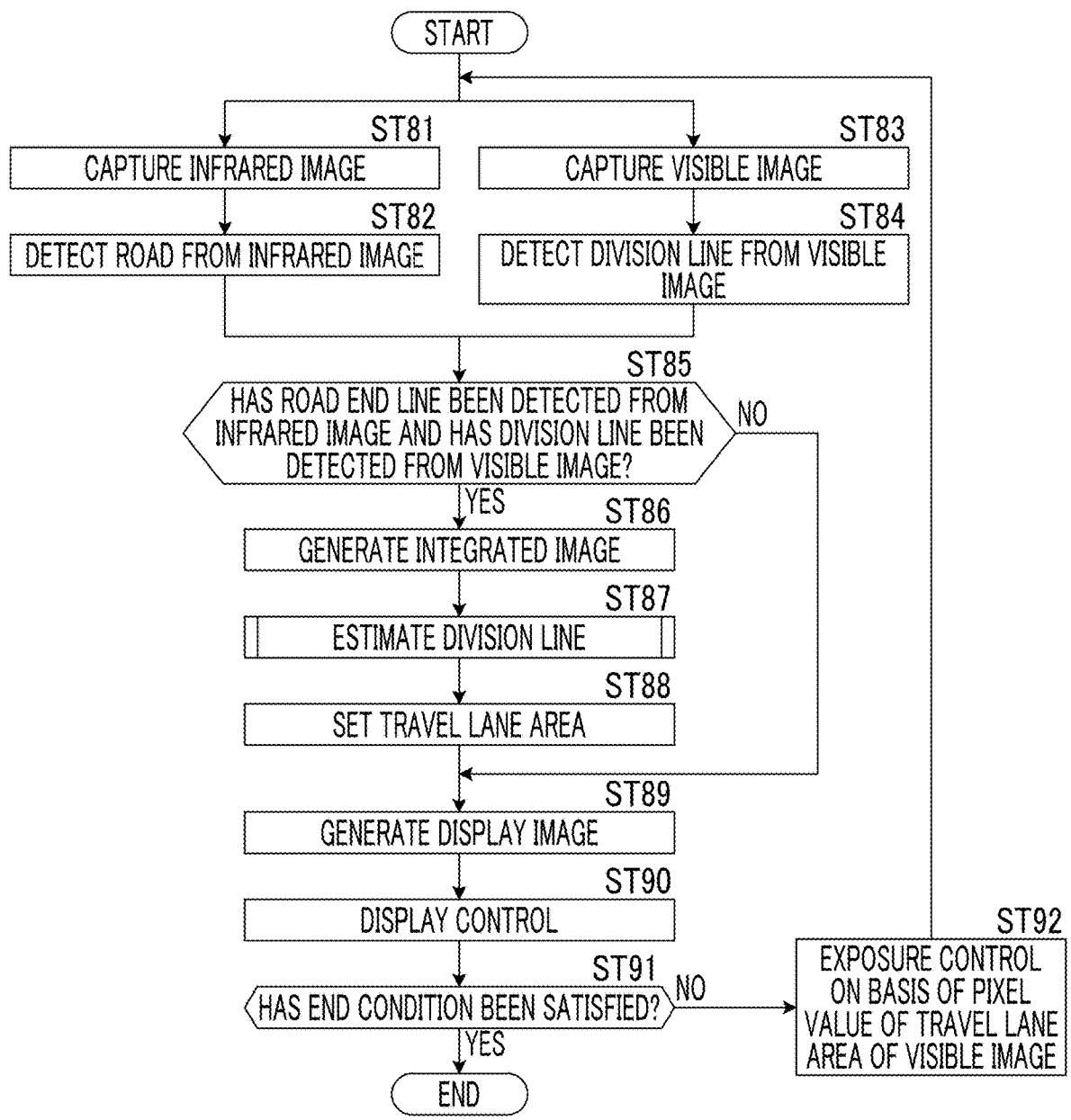

TRAVEL ASSISTANCE DEVICE AND TRAVEL ASSISTANCE METHOD USING TRAVEL ASSISTANCE DEVICE

CROSS-REFERENCE TO RELATED APPLICATIONS

This application is a continuation application of International Application No. PCT/JP2016/004052, filed Sep. 6, 2016, the disclosure of which is incorporated herein by reference in its entirety. Further, this application claims priority from Japanese Patent Application No. 2015-179506 filed on Sep. 11, 2015, the disclosure of which is incorporated herein by reference in its entirety.

BACKGROUND

Technical Field

The present disclosure relates to a travel assistance device that assists in traveling of a vehicle and a travel assistance method using the travel assistance device, and more particularly, to a travel assistance device that assists in traveling of a vehicle on the basis of an infrared image captured by an infrared imaging unit mounted on a vehicle, and a visible image captured by a visible imaging unit mounted on the vehicle, and a travel assistance method using the travel assistance device.

Related Art

In the related art, various technologies for extracting information for assisting in traveling of a vehicle on the basis of an image captured by a camera mounted on a vehicle in order to assist in traveling of a road or the like have been proposed.

For example, JP04584277B and JP2001-101596A disclose a technology for mounting a visible camera and an infrared camera on a vehicle, imaging a corresponding range using the visible camera and the infrared camera, detecting a division line from a visible image captured by the visible camera, and superimposing and displaying the detected division line on an infrared image captured by the infrared camera. JP2001-101596A discloses a technology for estimating and calculating a traveling direction of a vehicle on the basis of a vehicle speed and a steering angle in a case where a division line cannot be detected from a visible image, estimating an area having a predetermined width in a vehicle width direction with respect to a traveling direction of a subject vehicle as a travel road, and superimposing the travel road on an infrared image.

Further, JP2006-185406A and JP2005-316607A disclose a technology for detecting a straight line connecting a plurality of boundary line candidates detected from a visible image as a division line on a road.

Here, in a situation in which visible light at night or the like is limited, a portion of an imaging range of a visible image such as a place at which light from a headlight does not arrive may have illuminance lower than a minimum illuminance of a visible imaging unit.

In such a case, a division line having the illuminance lower than the minimum illuminance in the visible image has a substantially uniformly small pixel value, and the division line having the illuminance lower than the minimum illuminance in the visible image cannot be detected on the basis of brightness and darkness of the pixel value of the visible image.

However, the technologies disclosed in JP04584277B, JP2001-101596A, JP2006-185406A, and JP2005-316607A cannot solve the above problem since the technologies are technologies for detecting a division line from a visible image on the basis of brightness and darkness of the pixel value of the visible image. Further, according to the technology of JP2001-101596A, a travel road estimated without depending on information on an external environment such as a road or a division line is unclear in a relationship with the division line or the road, and the division line cannot be estimated on the basis of the travel road.

SUMMARY

The present disclosure proposes a travel assistance device that estimates a division line of a road using an infrared image captured by an infrared imaging unit and a visible image captured by a visible imaging unit even in a case where a division line having an illuminance lower than a minimum illuminance of a visible imaging unit in a visible image cannot be detected on the basis of a pixel value of the visible image, and a travel assistance method using such the travel assistance device.

An infrared imaging device according to a first aspect comprises an infrared imaging unit that is mounted on a vehicle and captures an infrared image in front of the vehicle; a visible imaging unit that is mounted on the vehicle and captures a visible image in a range corresponding to a range indicated by the infrared image; a road detection unit that detects a road end line of a road on which the vehicle travels from the captured infrared image; a division line detection unit that detects a division line of the road from the captured visible image; an image generation unit that generates an integrated image indicating the road end line and the division line on the basis of the infrared image and the visible image registered with each other; and a division line estimation unit that estimates an extended portion of the division line in the integrated image on the basis of the division line and the road end line in the integrated image.

An infrared imaging method according to a second aspect is a travel assistance method that is performed by a travel assistance device including an infrared imaging unit mounted on a vehicle and a visible imaging unit mounted on the vehicle, the travel assistance method comprising: an infrared imaging step of capturing an infrared image in front of the vehicle; a visible imaging step of capturing a visible image in a range corresponding to a range indicated by the infrared image; a road detection step of detecting a road end line of a road on which the vehicle travels from the captured infrared image; a division line detection step of detecting a division line of the road from the captured visible image; an image generation step of generating an integrated image indicating the road end line and the division line on the basis of the infrared image and the visible image registered with each other; and a division line estimation step of estimating an extended portion of the division line in the integrated image on the basis of the division line and the road end line in the integrated image.

"The front of the vehicle" means the front in a case where the vehicle moves. For example, the front of the vehicle means the front in a case where a direction in which the vehicle moves forward in a case where the vehicle moves forward, and means the front in a case where a direction in which the vehicle moves backward in a case where the vehicle moves backward is a forward direction.

The "division line" means a line provided on a road surface in the traveling direction of the road in order to divide the road. For example, the division line includes a lane boundary line, a partition line indicating a boundary between a lane and a roadside band, and a boundary line between a lane and a sidewalk.

In the travel assistance device according to a third aspect, the division line estimation unit estimates the extended portion of the division line in the integrated image according to a condition that the division line extends in parallel to the road end line in a traveling direction of the road and the division line is located at a constant distance from the road end line in a transverse direction orthogonal to the traveling direction of the road on a road surface.

The "transverse direction orthogonal to the traveling direction of the road" means that the traveling direction and the transverse direction of the road are substantially orthogonal to each other. For example, the transverse direction includes a direction not strictly orthogonal to the traveling direction of the road in a case where the transverse direction is regarded as being substantially orthogonal to the traveling direction of the road.

In the travel assistance device according to a fourth aspect, the image generation unit generates a first integrated image which is a two-dimensional image indicating the road end line and the division line as the integrated image on the basis of the infrared image and the visible image registered with each other, and the division line estimation unit performs a first estimation process of calculating an internal division ratio at which a reference point on one of two road end lines and a reference point on the other of the two road end lines are internally divided by a reference point on the division line on a line extending in a horizontal direction of the first integrated image in a state in which the first integrated image is arranged with a downward direction of the vehicle set as a downward direction of the image in a case where the two road end lines respectively indicating both ends of the road are detected, and calculating respective candidate points of the division lines according to a condition that a point on the one road end line, a point on the other road end line, and a point on the division line maintain the internal division ratio on a line extending in the horizontal direction passing through each point from each reference point to an intersection point of the two road end lines, and estimating the extended portion of the division line on the basis of the calculated candidate points of the division lines.

In the travel assistance device according to a fifth aspect, the image generation unit generates a second integrated image which is a two-dimensional image indicating the road end line and the division line as the integrated image on the basis of the infrared image and the visible image registered with each other, and the division line estimation unit performs a second estimation process of calculating respective candidate points of the division lines corresponding to the respective points of the road end lines according to a condition that a distance in the horizontal direction between the road end line and the division line increases at a constant ratio as a distance in a vertical direction from an upper end of the road end line increases in the second integrated image in a state in which the second integrated image is arranged with a downward direction of the vehicle set as a downward direction of the image, and estimating the extended portion of the division line on the basis of the calculated candidate points of the division lines.

In the travel assistance device according to a sixth aspect, the division line estimation unit performs the second estimation process, the division line estimation unit detects an upper end of the road end line in a state in which the second integrated image is arranged with the downward direction of the vehicle set as the downward direction of the image, calculates a first reference distance in the horizontal direction from the reference point of the road end line to the division line, sets a second reference distance in the horizontal direction from the upper end to the extended portion of the division line to zero, and calculates the constant ratio on the basis of a ratio of a difference between the first reference distance and the second reference distance with respect to a distance in the vertical direction from the reference point of the road end line to the upper end, and performs the second estimation process.

In the travel assistance device according to a seventh aspect, the division line estimation unit performs the second estimation process, the division line estimation unit detects an upper end of the road end line in a state in which the second integrated image is arranged with the downward direction of the vehicle set as the downward direction of the image, calculates a first reference distance in the horizontal direction from a first reference point of the road end line to the division line, calculates a second reference distance in the horizontal direction from a second reference point of the road end line to the division line, and calculates the constant ratio on the basis of a ratio of a difference between the first reference distance and the second reference distance with respect to a distance in the vertical direction from the first reference point to the second reference point, and performs the second estimation process.

In the travel assistance device according to an eighth aspect, the division line estimation unit performs the first estimation process in a case where two road end lines indicating both ends of the road are detected, and performs a second estimation process of calculating respective candidate points of the division lines corresponding to the respective points of the road end lines according to a condition that a distance in the horizontal direction between the road end line and the division line increases at a constant ratio as a distance in a vertical direction from an upper end of the road end line increases in a state in which the first integrated image is arranged with a downward direction of the vehicle set as a downward direction of the image in a case where a road end line indicating one end of the road is detected and a road end line indicating the other end of the road is not detected, and estimating the extended portion of the division line on the basis of the calculated candidate points of the division lines.

In the above, "the downward direction of the vehicle corresponds to the downward direction of the image" means that the downward direction of the integrated image substantially matches the downward direction of the vehicle. For example, "the downward direction of the vehicle corresponds to the downward direction of the image" includes that the downward direction of the integrated image does not strictly match the downward direction of the vehicle in a case where the downward direction of the integrated image is regarded as substantially matching the downward direction of the vehicle.

The "case where the road end line indicating one end of the road is detected and the road end line indicating the other end of the road is not detected" means a case where only the road end line indicating one end among road end lines indicating both ends of the road is detected, and the road end line indicating the other end of the road is not detected.

In the travel assistance device according to a ninth aspect, the road detection unit detects a plurality of candidate points indicating the road end line, and approximates the road end line as a polynomial curve on the basis of the plurality of detected candidate points, and the division line detection unit approximates the division line as a polynomial curve on the basis of candidate points of the division line.

In the travel assistance device according to a tenth aspect, the image generation unit generates a display image indicating the division line, the extended portion of the division line, and the road end line, and the travel assistance device further comprises a display control unit that displays the generated display image on a display screen.

The travel assistance device according to an eleventh aspect further comprises: an area setting unit that sets a travel lane area of the road in which the vehicle travels, on the basis of the division line, the extended portion of the division line, and the road end line; an object detection unit that detects an isothermal object from the infrared image; a warning unit that presents a warning for a driver of the vehicle; and a determination unit that determines presence or absence of the object in the travel lane area and causes the warning unit to present a warning in a case where there is the object.

In the above case, the determination unit may estimate an entrance time at which the object enters the travel lane area on the basis of a distance between the travel lane area and the object and a movement speed of the object, estimate an arrival time at which the vehicle arrives at the position of the object on the basis of a distance between the object and the vehicle and a movement speed of the vehicle, and cause a warning to be presented in a case where the entrance time is before the arrival time.

The "isothermal object" means an isothermal animal having a temperature different from that of a road or a vehicle. For example, an isothermal object includes a person, or an isothermal animal such as a dog.

The travel assistance device according to a twelfth aspect further comprises: an area setting unit that sets a travel lane area of the road in which the vehicle travels, on the basis of the division line, the extended portion of the division line, and the road end line; and an exposure correction unit that performs an exposure correction process for the visible image on the basis of pixel values of the travel lane area in the visible image.

The travel assistance device according to a thirteenth aspect further comprises: an area setting unit that sets a travel lane area of the road in which the vehicle travels, on the basis of the division line, the extended portion of the division line, and the road end line; and an exposure control unit that performs exposure control of the visible imaging unit on the basis of pixel values of the travel lane area in the visible image.

According to the travel assistance device of the present disclosure and the travel assistance method of the travel assistance device of the present disclosure, even in a case where the division line having an illuminance lower than the minimum illuminance of the visible imaging unit in the visible image cannot be detected on the basis of the pixel value of the visible image, the road end lines of the road on which the vehicle travels are detected from the infrared image, the division line of the road is detected from the visible image, and an integrated image indicating the road end lines and the division line is generated on the basis of the infrared image and the visible image registered with each other, and the extended portion of the division line in the integrated image is estimated on the basis of the division line and the road end line in the integrated image. Thus, it is possible to suitably estimate the extended portion of the division line.

BRIEF DESCRIPTION OF THE DRAWINGS

FIG. 16 is a flowchart illustrating a flow of a process in a travel assistance device of the fourth embodiment.

DETAILED DESCRIPTION

Figure 1:
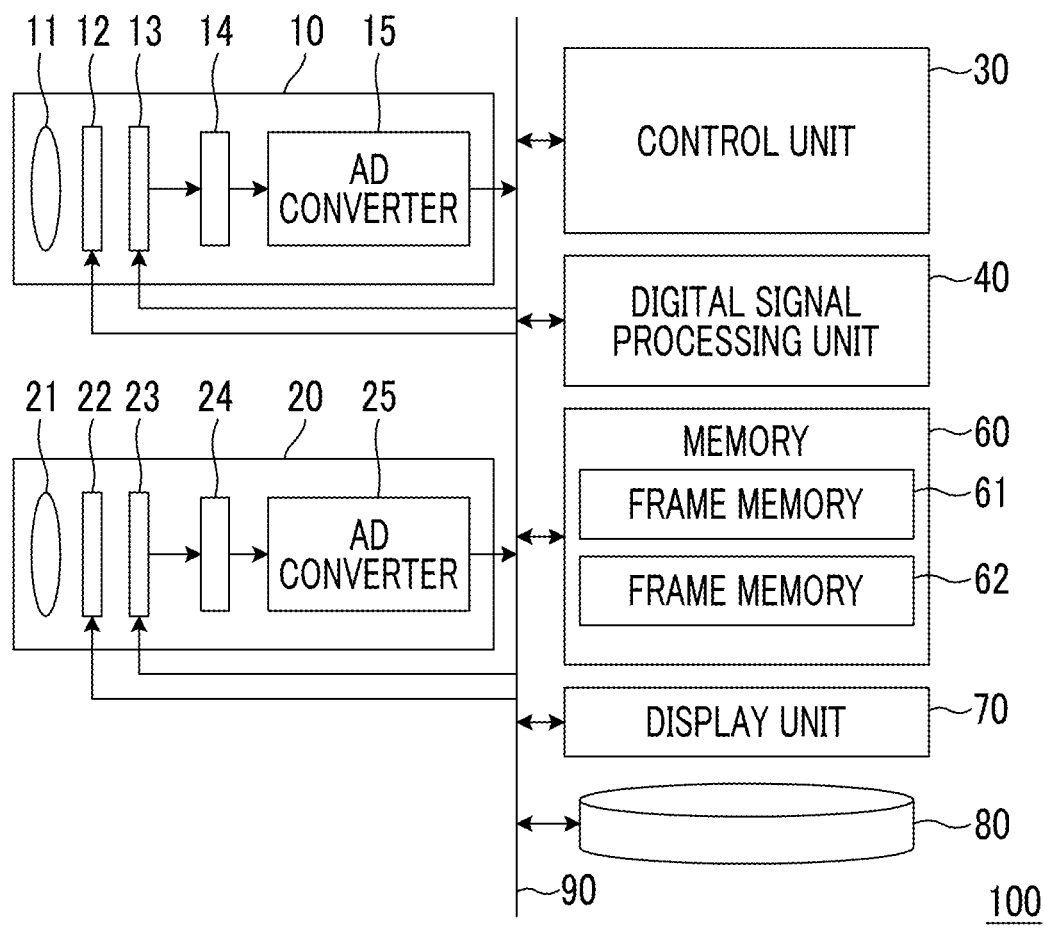
FIG. 1 is a block diagram illustrating a travel assistance device according to an embodiment of the present invention.

Hereinafter, embodiments of the present invention will be described with reference to the drawings. FIG. 1 is a block diagram illustrating a travel assistance device 100 according to an embodiment of the present invention.

As illustrated in FIG. 1, the travel assistance device 100 includes an infrared imaging unit 10 that captures an infrared image, a visible imaging unit 20 that captures a visible image, a control unit 30, a digital signal processing unit 40 that performs various types of image processing on the infrared image and a visible image, a memory 60, a display unit 70, an auxiliary storage device 80, and a bus 90 that connects the respective units so that the unit can perform communication.

The infrared imaging unit 10 is mounted on a vehicle and has a function of capturing an infrared image of the front of the vehicle. The infrared imaging unit 10 includes an optical system 11 for infrared imaging, a stop 12 that adjusts exposure at the time of infrared imaging, an infrared detector 13 that is an image sensor located on an image forming surface of the optical system 11, detects infrared rays passing through the optical system 11, and outputs an infrared image, an analog signal processing circuit 14 that performs known analog signal processing including an amplification process on each pixel value of the infrared image detected by the infrared detector 13, and an AD conversion circuit 15 that performs analog to digital conversion (AD conversion) on each pixel value of the infrared image subjected to analog signal processing. The converted digital image signal is recorded as image data of a frame image of one frame in a frame memory 61 to be described below.

The infrared detector 13 includes an image sensor in which a plurality of infrared detection elements are arranged in a matrix form. The infrared detector 13 is an infrared detector capable of detecting infrared rays (with a wavelength of 0.7 μm to 1 mm), and particularly, an infrared detector capable of detecting far infrared rays (with a wavelength of 4 μm to 1 mm). For example, a bolometer type infrared detection element can be used as the infrared detection element of the infrared detector 13.

The visible imaging unit 20 is mounted on the vehicle and has a function of capturing a visible image in a range corresponding to a range indicated by the infrared image. The visible imaging unit 20 includes an optical system 21 for visible imaging, a stop 22 that adjusts exposure at the time of visible imaging, a detector 23 that is an image sensor that is located on an image forming surface of the optical system 21, detects visible rays passing through the optical system 21, and outputs a visible image, an analog signal processing circuit 24 that performs known analog signal processing including an amplification process on each pixel value of the visible image detected by the detector 23, and an AD conversion circuit 25 that performs analog to digital conversion (AD conversion) on each pixel value of the visible image subjected to analog signal processing. The converted digital image signal is recorded as image data of a frame image of one frame in a frame memory 62 to be described below. Further, the visible imaging unit 20 and the infrared imaging unit 10 are arranged near each other, and are configured to be able to image an external area in substantially the same range from substantially the same imaging position.

The memory 60 includes a read only memory (ROM) area and a random access memory (RAM) area. The RAM area of the memory 60 functions as a work memory for executing processes in the control unit 30 and the digital signal processing unit 40 or a temporary storage destination of various types of data. The ROM area of the memory 60 stores a program for controlling the control unit 30 and the digital signal processing unit 40 or data necessary for various processes such as an exposure table and an exposure condition table which will be described below. Further, the ROM area stores a program that defines a travel assistance process according to the embodiment. The RAM area of the memory 60 includes a frame memory 61 and a frame memory 62. The frame memory 61 and the frame memory 62 temporarily record image data at the time of each image processing, as necessary.

The auxiliary storage device 80 includes various storage media such as a hard disk. The auxiliary storage device 80 stores, for example, an infrared image, a visible image, an image obtained by superimposing an infrared image and a visible image, or various display images subjected to image processing by a digital signal processing unit to be described below, via a media interface (not illustrated).

The display unit 70 includes a known display such as a liquid crystal type display. The display unit 70 appropriately displays a corresponding image and necessary information according to control of a display control unit 31 to be described below. For example, the various images displayed on the display unit 70 are, for example, images acquired by imaging, display images generated by the image generation unit 43 described below, and images recorded in the auxiliary storage device 80.

The control unit 30 performs overall control of the travel assistance device 100 according to the program stored in the memory 60. The control unit 30 appropriately synchronizes the infrared imaging unit 10 with the visible imaging unit 20 to perform respective imaging controls and various processes required at the time of imaging. For example, the control unit 30 controls the stop 12 according to a target F value on the basis of exposure conditions such as an F value or a shutter speed set in the memory 60, and controls an imaging time of the infrared detector 13 according to the target shutter speed to cause the infrared imaging unit 10 to execute capturing of the infrared image. Further, the control unit 30 controls the stop 22 according to the target F value on the basis of exposure conditions such as the F value or the shutter speed set in the memory 60, and controls an imaging time of the detector 23 according to the target shutter speed to cause the visible imaging unit 20 to execute capturing of the visible image. Further, the control unit 30 executes, for example, control of the digital signal processing unit 40, storage or reading of data in or from the auxiliary storage device 80, and the like.

Figure 2:
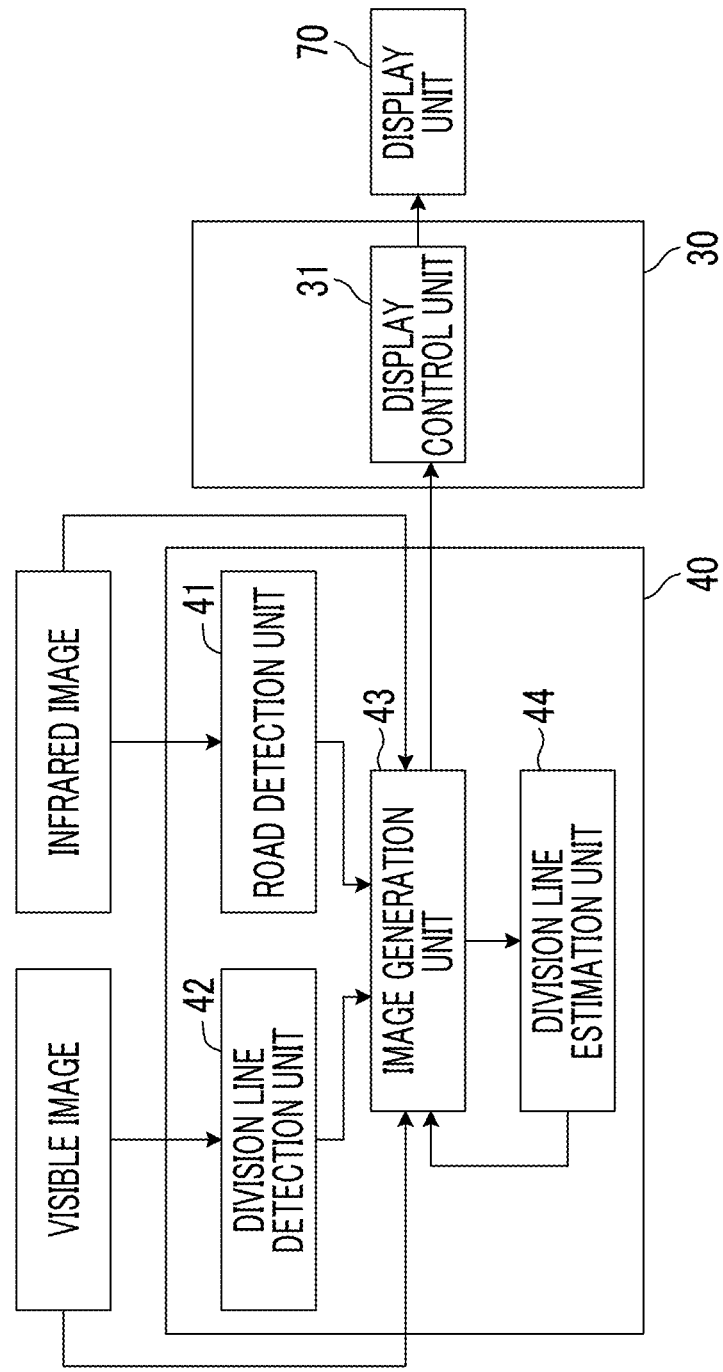
FIG. 2 is a block diagram illustrating a configuration of a digital signal processing unit and a control unit in a first embodiment.

FIG. 2 is a block diagram illustrating a configuration of the digital signal processing unit 40 and the control unit 30 in the first embodiment. In each embodiment of the present specification, the control unit 30 functions as a display control unit 31 for controlling a display of the display unit 70 by executing a program that defines the travel assistance process according to this embodiment stored in the memory 60.

The digital signal processing unit 40 functions as a road detection unit 41 that detects a road end line of a road on which a vehicle travels from the captured infrared image, a division line detection unit 42 that detects a division line of the road from the captured visible image, an image generation unit 43 that generates an integrated image indicating the road end lines and the division line on the basis of the infrared image and the visible image registered with each other, and a division line estimation unit 44 that estimates an extended portion of the division line in the integrated image on the basis of the division lines and the road end line in the integrated image, by executing a program that defines the travel assistance process according to the embodiment stored in the memory 60.

On the basis of the infrared image, the road detection unit 41 detects a point on an outline of the road on the basis of a difference between pixel values of the road and the area outside the road as a candidate point of a road end line, which indicates an end of the road area using a known scheme. The road detection unit 41 performs fitting using a least squares method on the basis of the detected candidate point to approximate a polynomial curve. The approximated curve is detected as a road end line. An order of the polynomial may be limited to a second or third order according to a curve shape that the road end line can generally take in the infrared image. In a case where the road end line has a linear shape in the infrared image, fitting using a least squares method or the like may be performed to approximate the road end line to a straight line.

Hereinafter, in a case where the road detection unit 41 detects only the road end line on one side of the road, the road end line on the one side is referred to as a first road end line. In a case where the road detection unit 41 detects road end lines (two road end lines) on both sides, one road end line is referred to as a first road end line, and the other road end line is referred to as a second road end line. The road end lines may not be detected, for example, in a case where the road end is not included in the infrared image, such as a case where a vehicle travels on a wide road, a case where the road end is obstructed by an obstacle such as another vehicles, a person, or an electric pole and the road end is not included in the infrared image, or a case where there is no difference between pixel values of the road and the area outside the road even in a case where the road end is included in the infrared image.

On the basis of the visible image, the division line detection unit 42 detects a plurality of points on an outline of a division line on the basis of a difference between pixel values of the division line and the area outside the division line as division line candidate points on the division line using a known scheme. The division line detection unit 42 performs fitting using a least squares method on the basis of the detected candidate point to approximate a polynomial curve. The approximated curve is detected as a division line. An order of the polynomial may be limited to a second or third order in conformity with a curve shape which the division line can generally take in the visible image. In a case where the road end line has a linear shape in the visible image, fitting using a least squares method or the like may be performed to approximate the road end line to a straight line.

On the basis of the infrared image and the visible image that have been registered, the image generation unit 43 generates an integrated image (a first integrated image or a second integrated image) indicating the road end line and the division line. Here, on the basis of known relative position information of the infrared image and the visible image, the image generation unit 43 converts a coordinate system of the visible image into a reference coordinate system using a coordinate system of the infrared image as a reference coordinate system to register the infrared image with the visible image.

The image generation unit 43 may register the infrared image with the visible image using an arbitrary scheme. For example, the coordinate system of the infrared image may be converted into a reference coordinate system using the coordinate system of the visible image as a reference coordinate system, and an integrated image may be generated on the basis of the reference coordinate system. Further, for example, in a case where a relative position information between the infrared image and the visible image is not known, rotation, movement, enlargement and reduction, and the like of the image may be performed in an arbitrary combination so that positions of landmarks included in both the infrared image and the visible image match each other, and registration of the infrared image and the visible image may be performed. Further, in a case where the infrared imaging unit 10 and the visible imaging unit 20 are provided close to each other and the infrared image and the visible image are regarded as being captured from substantially the same position, the infrared image and the visible image are registered, and a special process for registration may be omitted.

Figure 3:
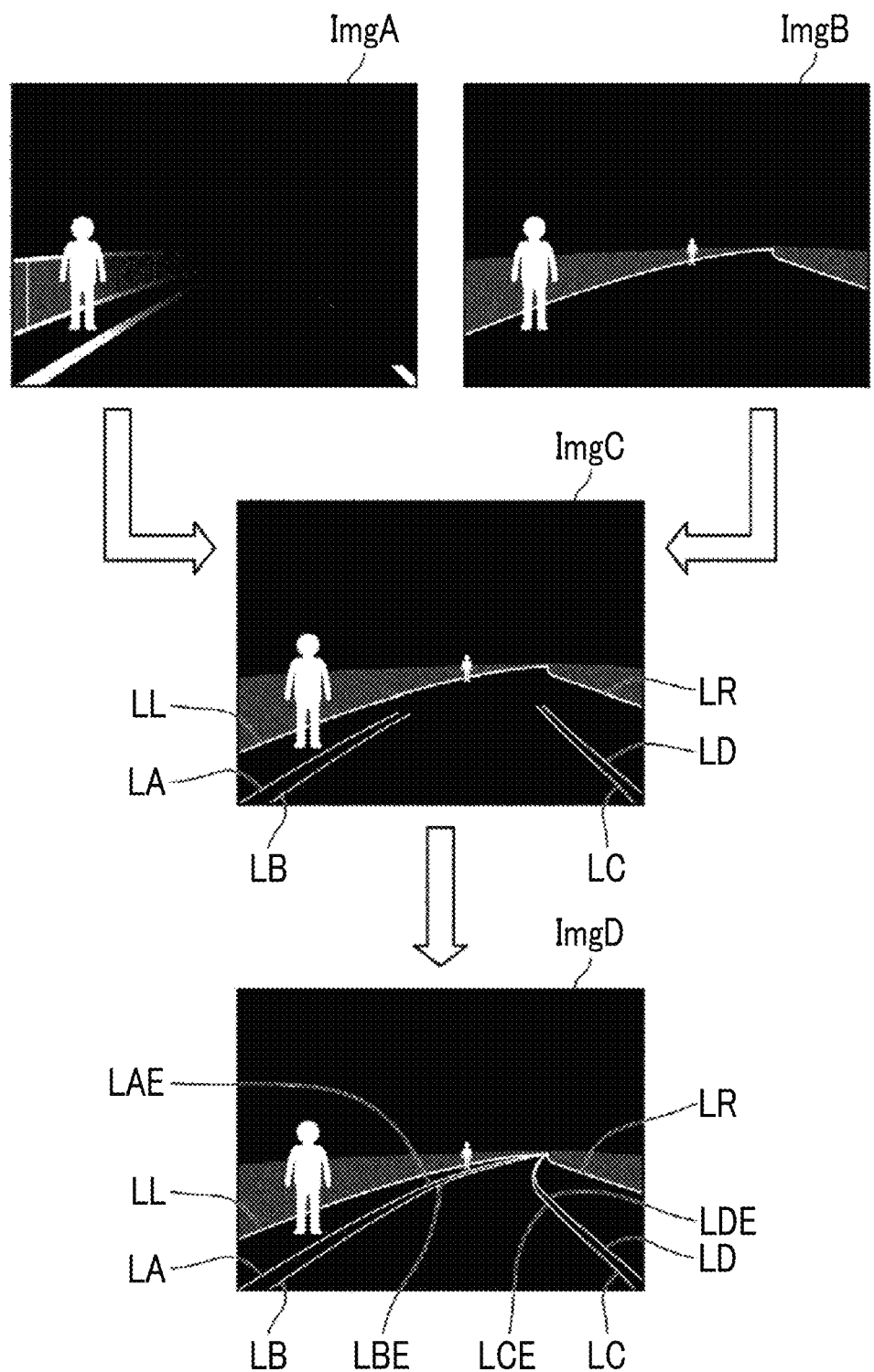
FIG. 3 is a diagram illustrating an image that is generated in the first embodiment.

The image generation unit 43 generates an integrated image indicating the road end line and the division line in the reference coordinate system. FIG. 3 is a diagram illustrating an image that is generated in the first embodiment. As illustrated in FIG. 3, in the embodiment, the image generation unit 43 generates an integrated image ImgC which is an image in which the division lines LA, LB, LC, and LD detected from the visible image ImgA and the road end lines LL and LR detected from the infrared image ImgB are superimposed on the infrared image ImgB on the basis of the infrared image ImgB and the visible image ImgA. In a case where the integrated image includes at least the road end lines and the division line in the reference coordinate system corresponding to the coordinate system of the two-dimensional image observed from the imaging unit mounted on the vehicle, the integrated image may include other information indicating an object such as a pedestrian, or another vehicle. Further, the image generation unit 43 may generate the integrated image as a three-dimensional image in a case where the distance information in the imaging direction at the time of imaging of the infrared image or the visible image can be acquired, in addition to the infrared image and the visible image.

Further, the image generation unit 43 generates various display images necessary for a display. In this embodiment, as illustrated in FIG. 3, the image generation unit 43 generates, as a display image ImgD, an image in which the division lines LA, LB, LC, and LD detected from the visible image ImgA, the extended portions LAE, LBE, LCE, and LDE thereof, and the road end lines LL and LR detected from the infrared image ImgB are superimposed on the infrared image ImgB, on the basis of the infrared image ImgB and the visible image ImgA. Such a display image ImgD is different from the integrated image ImgC in that the extended portions LAE, LBE, LCE, and LDE of the division line are added. With the display image, it is possible to provide information for recognizing the relative positional relationship among the road end line, the division line, and the estimated extended portion of the division line by displaying an image indicating the road end line, the division line, and the estimated extended portion of the division line in such a two-dimensional reference coordinate system subjected to the registration.

Each image generated by the image generation unit 43 is appropriately stored in the auxiliary storage device 80. The infrared image captured by the infrared imaging unit 10, the visible image captured by the visible imaging unit 20, and each image generated by the image generation unit 43 may be appropriately subjected to another necessary correction process or the like by the digital signal processing unit 40 before or after a travel assistance process.

Next, a principle of estimating the extended portion of the division line in the division line estimation unit 44 will be described.

Generally, in the case of nighttime or the like, a subject such as a road, a division line, or a person, which is a subject having an illuminance equal to or higher than the minimum illuminance of the visible imaging unit 20 can be identified from the visible image, but a subject having an illuminance lower than the minimum illuminance such as a subject at which light of a headlight does not arrive cannot be identified. On the other hand, information on the road end lines can be obtained on the basis of infrared rays radiated from the road regardless of an illuminance of the visible light from the infrared image, but a subject such as the division line on the road with a small temperature difference from the road cannot be clearly detected.

Therefore, as illustrated in FIG. 3, a division line having an illuminance equal to or higher than the minimum illuminance of the visible imaging unit 20 can be identified in the visible image ImgA, but a division line (the extended portion of the division line) having an illuminance lower than the minimum illuminance of the visible imaging unit 20 is blacked out and cannot be identified. Further, the road end line can be identified irrespective of the illuminance of the visible light in the infrared image ImgB, but the division line cannot be identified. In such a case, even in a case where information obtained from the infrared image ImgB and the information obtained from the visible image ImgA are simply combined, the extended portion of the division line having an illuminance lower than the minimum illuminance of the visible imaging unit 20 cannot be identified.

The present invention detects road end lines of a road on which a vehicle travels from an infrared image even in a case where a division line having an illuminance lower than a minimum illuminance of the visible imaging unit 20 in the visible image cannot be detected on the basis of a pixel value of the visible image, detects the division line of the road from the visible image, and estimates an extended portion of the division line on the basis of the division line and the road end lines that have been detected in view of the above circumstances.

In particular, the present invention focuses on a feature that the division line is provided along the road end line in the traveling direction of the road and the division line is often provided at a position spaced by a predetermined distance from a road end in a transverse direction of the road. The above feature has been found to be recognized as a condition (the first condition) that the division line extends in parallel to the road end line in a traveling direction of the road and the division line is located at a constant distance from the road end line in a transverse direction orthogonal to the traveling direction of the road on a road surface. Therefore, the division line estimation unit 44 estimates the extended portion of the division line in the integrated image according to the first condition. Thus, it is possible to estimate the position of the extended portion of the division line from the information on the road end line obtained from the infrared image and the information on the division line obtained from the visible image.

Further, it is preferable that an integrated image which is a two-dimensional image can be generated on the basis of the visible image and the infrared image captured from the visible imaging unit 20 and the infrared imaging unit 10 mounted on the vehicle, and a division line estimation process can be performed on the basis of the first condition on the two-dimensional integrated image. This is because it is preferable to reduce a burden of acquiring information on a three-dimensional image of the road and to be able to execute the division line estimation process more easily. Therefore, here, the first condition is further embodied as a first estimation condition or a second estimation condition below, and the division line estimation process is performed on the basis of the first estimation condition or the second estimation condition.

In a case where the distance information in the imaging direction at the time of capturing of the visible image or the infrared image can be acquired using a known method, the image generation unit 43 may generate the integrated image of the three-dimensional image on the basis of the distance information. In this case, the division line estimation unit 44 may calculate a constant distance between the road end line and the division line on the road surface on the basis of the road end line detected from the infrared image and the division line detected from the visible image in the integrated image, and estimate that the extended portion of the division line is located at a constant distance from the road end line to estimate the extended portion of the division line. A technology of measuring a distance in front of a vehicle using a three-dimensional shape measurement device, or a technology of providing two infrared imaging units 10 and acquiring distance information in a depth direction of the infrared image on the basis of a parallax is conceivable as a technology for acquiring distance information in front of the vehicle.

The first estimation condition is a condition that an internal division ratio at which a reference point on one of two road end lines and a reference point on the other of the two road end lines are internally divided by a reference point on the division line on a line extending in a horizontal direction of the integrated image in a state in which the integrated image is arranged with a downward direction of the vehicle (a direction from a ceiling surface side to a bottom surface side of the vehicle) set as a downward direction of the image is calculated, and a point on the one road end line, a point on the other road end line, and a point on the division line maintain the internal division ratio on a line extending in the horizontal direction passing through each of points from the respective reference points to an intersection of the two road end lines.

The second estimation condition is a condition that a distance in the horizontal direction between the road end line and the division line increases at a constant ratio as a distance in a vertical direction from an upper end of the road end line increases in the integrated image in a state in which the integrated image is arranged with a downward direction of the vehicle set as a downward direction of the image.

In a case where the reference coordinate system corresponding to the coordinate system of the two-dimensional image observed from the imaging unit mounted on the vehicle is set on the basis of the infrared image and the visible image, the reference coordinate system is a so-called camera coordinate system. Therefore, in a case where the integrated image is generated to indicate at least the road end line and the division line on the basis of the reference coordinate system, the road and the division line are expressed by the center projection method. Further, it is conceivable that in a case where the integrated image is arranged such that the downward direction of the vehicle becomes the downward direction of the image, the traveling direction of the road corresponds to a longitudinal direction of the integrated image, and a transverse direction of the road corresponds to the transverse direction of the integrated image in the first condition.

In a case where the first condition is satisfied using this, it is conceivable that an internal division ratio at which a reference point on one of the two road end lines and a reference point on the other of the two road end lines are internally divided by a reference point on the division line on a line extending in the horizontal direction in a state in which the integrated image is arranged with a downward direction of the vehicle set as a downward direction of the image is constant, and it is conceivable that the first estimation condition is established. Further, the road end line smoothly extending in the traveling direction of the road is detected from the infrared image, and in a case where the first condition is satisfied, it is conceivable that a distance between the road and the division line decreases at a constant ratio from a lower side to a upper side of the image according to the center projection method in the integrated image arranged with the downward direction of the vehicle set as the downward direction of the image, and it is conceivable that the second estimation condition is established.

As described above, in a case where the extended portion of the division line is estimated on the basis of the first estimation condition or the second estimation condition using the integrated image represented by the reference coordinate system corresponding to the coordinate system of the two-dimensional image observed from the imaging unit mounted on the vehicle, it is possible to estimate the extended portion of the division line suitably from the information on the infrared image and the information on the visible image without newly acquiring, for example, information on the three-dimensional shape of the road.

Figure 4:
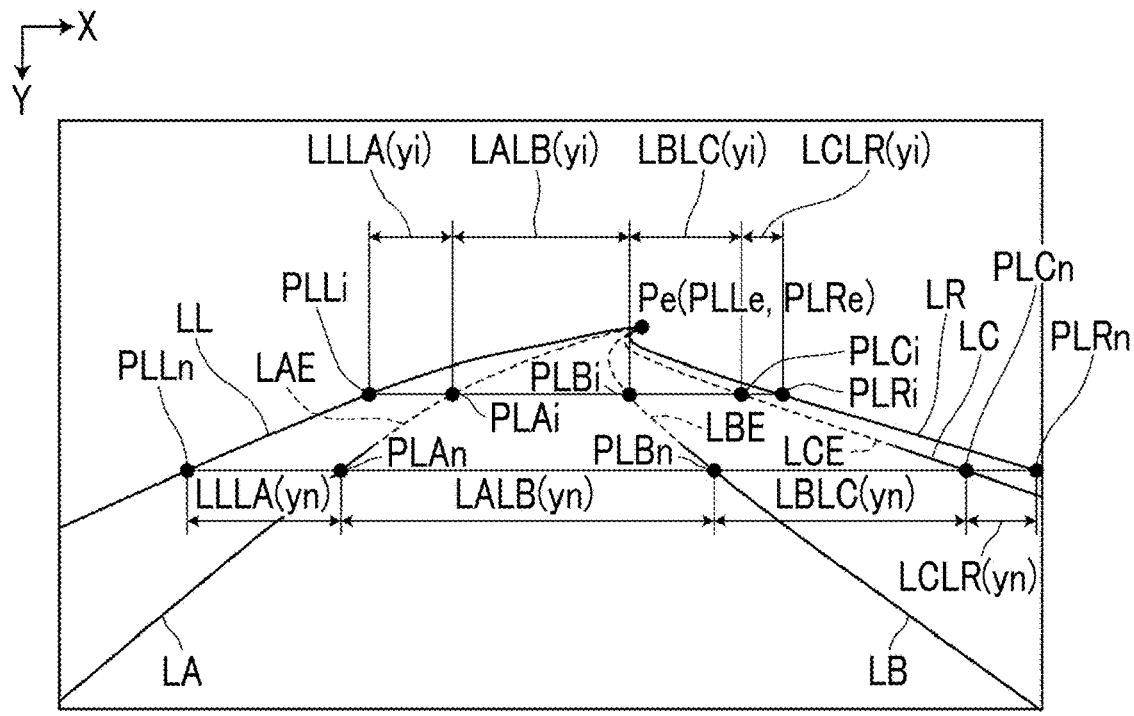
FIG. 4 is a diagram illustrating a first estimation process in a division line estimation unit.

FIG. 4 is a diagram illustrating a first estimation process of calculating respective candidate points of division lines according to the first estimation condition and estimating the extended portion of the division line on the basis of the calculated candidate points of the division lines. The first estimation process will be described with reference to FIG. 4. FIG. 4 is a diagram illustrating an integrated image (first integrated image) including the first road end line LL and the second road end line LR detected by the road detection unit 41, and the division lines LA, LB, and LC detected by the division line detection unit 42. In the integrated image, the downward direction (y-axis positive direction) of the image is set to a downward direction of the vehicle.

The division line estimation unit 44 calculates an intersection Pe of the first road end line LL which is an approximate curve indicating one end of the road and the second road end line LR which is an approximate curve indicating the other end of the road.

The division line estimation unit 44 selects a y coordinate value yn such that a straight line Y=yn intersects all of the first road end line LL, the second road end line LR, and the division lines LA, LB, and LC. The division line estimation unit 44 specifies a reference point PLLn on the first road end line LL, a reference point PLAn on the division line LA, a reference point PLBn on the division line LB, a reference point PLCn on the division line LC, and a reference point PLRn on the second road end line LR at the straight line Y=yn. In a case where the y coordinate of the intersection point Pe is ye, yn>ye.

The division line estimation unit 44 calculates a distance LLLA(yn) between the reference point PLLn on the first road end line LL and the reference point PLAn on the division line LA, a distance LALB(yn) between the reference point PLAn on the division line LA and the reference point PLBn on the division line LB, a distance LBLC(yn) between the reference point PLBn on the division line LB and the reference point PLCn on the division line LC, and a distance LCLR(yn) between the reference point PLCn of the division line LC and the reference point PLRn on the second road end line LR. The division line estimation unit 44 calculates a ratio of the distances LLLA(yn):LALB(yn):LBLC(yn):LCLR(yn).

The division line estimation unit 44 specifies the reference point PLLi on the first road end line LL and the reference point PLRi on the second road end line LR on y=yi (ye≤yi≤yn). The division line estimation unit 44 specifies a candidate point PLAi on the division line LA., a candidate point PLBi on the division line LB, and a candidate point PLCi on the division line LC so that LLLA(yn):LALB(yn):LBLC(yn):LCLR(yn)=LLLA(yi):LALB(yi):LBLC(yi):LCLR(yi). The division line estimation unit 44 performs a process of calculating the candidate point PLAi on the division line LA., the candidate point PLBi on the division line LB, and the candidate point PLCi on the division line LC for each y coordinate (yi) in a section of ye≤yi≤yn.

The division line estimation unit 44 approximates a polynomial curve by performing fitting using a least squares method on the basis of the plurality of candidate points PLAi on the division line LA in the section of ye≤yi≤yn and the division line LA. The division line estimation unit 44 estimates the approximated curve as a post-estimation division line. A portion obtained by excluding the division line LA from the post-estimation division line corresponds to an extended portion LAE of the estimated division line LA.

The division line estimation unit 44 also performs the same process as that for the division line LA on the division line LB and the division line LC to calculate post-estimation division lines. That is, the division line estimation unit 44 approximates the polynomial curve by performing fitting using a least squares method on the basis of the candidate point PLBi on the division line LB in the section of ye≤yi≤yn and the division line LB. The division line estimation unit 44 calculates the approximated curve as a post-estimation division line. The division line estimation unit 44 approximates the polynomial curve by performing fitting using a least squares method on the basis of the candidate point PLCi on the division line LC in the section of ye≤yi≤yn and the division line LC. The division line estimation unit 44 calculates the approximated curve as a post-estimation division line. As illustrated in FIG. 4, an extended portion LBE of the division line LB and an extended portion LCE of the division line LC are estimated.

As described above, in a case where the extended portion of the division line is estimated using the first estimation condition, the information on the two road end lines is used. Thus, a position of the extended portion of the division line can be accurately calculated.

Figure 5A:
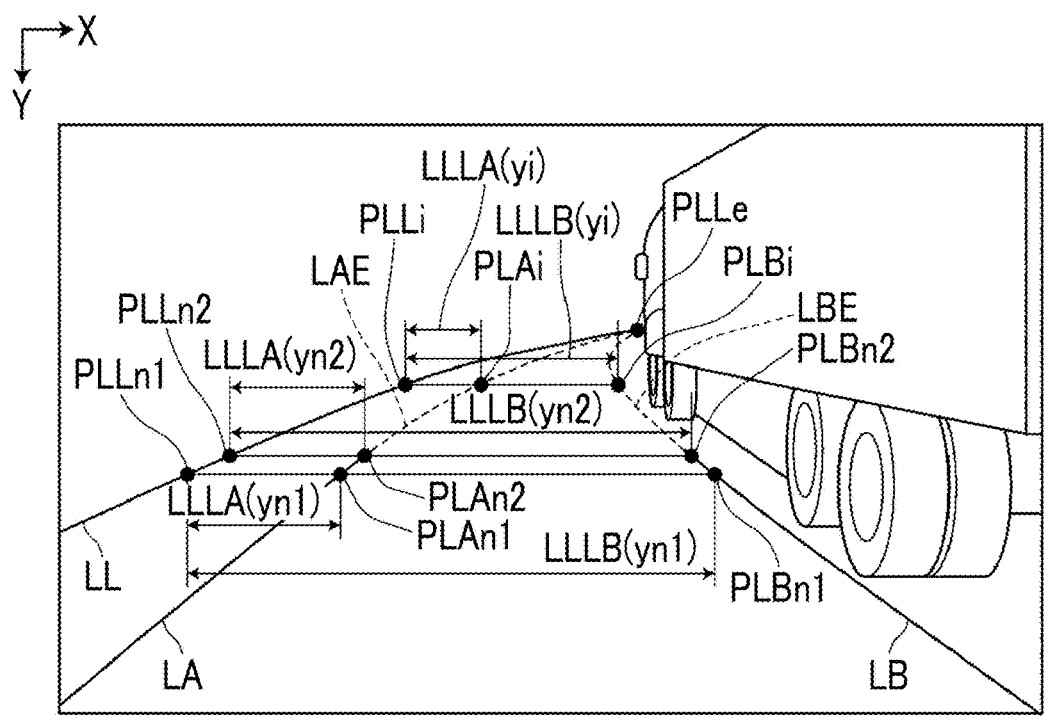
FIG. 5A is a diagram illustrating a second estimation process in the division line estimation unit.
Figure 5B:
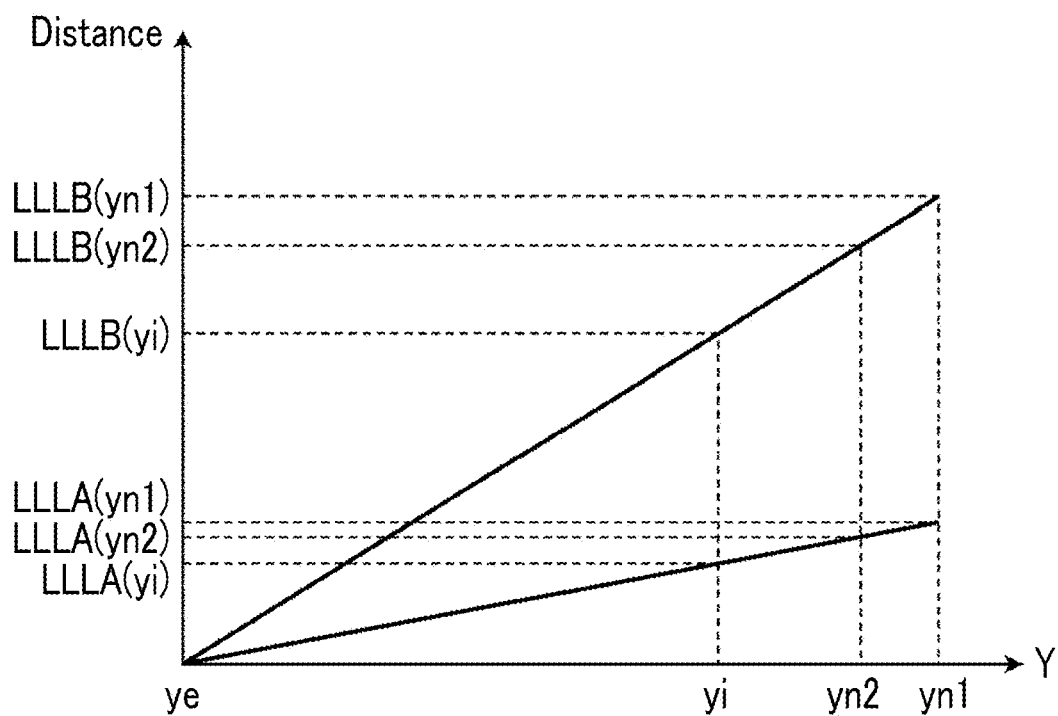
FIG. 5B is a diagram illustrating a ratio of a distance in a horizontal direction between a road end line and a division line with respect to a distance in a vertical direction from an upper end of a road end line in the second estimation process.

FIG. 5A is a diagram illustrating a second estimation process of calculating respective candidate points of division lines according to a second estimation condition and estimating extended portions of the division lines on the basis of the calculated candidate points of the division lines. FIG. 5B is a diagram illustrating a ratio of a distance in the horizontal direction between the road end line and the division line to a distance in the vertical direction from an upper end of the road end line in a state in which an integrated image (a second integrated image) is arranged with a downward direction of the vehicle set to a downward direction of the image. In FIG. 5B, the distance in the vertical direction from the upper end of the road end line is indicated as a lateral axis, and the distance in the horizontal direction between the road end line and the division line is indicated as a vertical axis. The second estimation process will be described with reference to FIGS. 5A and 5B.

First, the division line estimation unit 44 specifies a point at which a change in the pixel value is equal to or larger than a threshold value as an upper end PLLe of the first road end line on the basis of a change in pixel value on the first road end line.

The division line estimation unit 44 selects the y coordinate value yn1 such that a straight line Y=yn1 intersects all of the first road end line LL and the division lines LA and LB. The division line estimation unit 44 specifies a reference point PLLn1 on the first road end line LL, a reference point PLAn1 on the division line LA, and a reference point PLBn1 on the division line LB in the straight line Y=yn1. Here, in a case where the y coordinate of the upper end PLLe of the first road end line is ye, yn1>ye.

The division line estimation unit 44 calculates a first reference distance LLLA(yn1) between the reference point PLLn1 on the first road end line LL and the reference point PLAn1 on the division line LA, and a first reference distance LLLB(yn1) between the reference point PLLn1 on the first road end line LL and the reference point PLBn1 on the division line LB. Further, the division line estimation unit 44 estimates a second reference distance LLLA(ye) between the reference point PLLe on the first road end line LL and the candidate point on the division line LA on the straight line Y=ye passing through the upper end PLLe of the first road end line to be zero. Further, the division line estimation unit 44 estimates a second reference distance LLLB(ye) between the reference point PLLe on the first road end line LL and the candidate point on the division line LB to be zero.

As illustrated in FIG. 5B, the division line estimation unit 44 calculates a constant ratio αA=(LLLA(yn1)−LLLA(ye))/ (yn1−ye) which is a ratio of the difference between the first reference distance LLLA(yn1) and the second reference distance LLLA(ye) with respect to the distance (yn1−ye) in the vertical direction from the first reference point PLAn1 to the second reference point PLAe in a case where ye≤yi≤yn1. The division line estimation unit 44 calculates LLLA(yi)=αA×(yi−ye) at each y coordinate.

Further, similarly, the division line estimation unit 44 calculates a constant ratio αB=(LLLB(yn1)−LLLB(ye))/ (yn1−ye) which is a ratio of the difference between the first reference distance LLLB(yn1) and the second reference distance LLLB(ye) with respect to the distance (yn1−ye) in the vertical direction from the first reference point PLBn1 to the second reference point PLBe in a case where ye≤yi≤yn1. The division line estimation unit 44 calculates LLLB(yi)=αB×(yi−ye) at each y coordinate.

The division line estimation unit 44 sets a candidate point PLAi of the division line LA at a position separated by LLLA(yi) in a positive direction of the x axis from the reference point PLLi on the first road end line LL on the straight line y=yi (ye≤yi≤yn1) at each y coordinate yi in the section of ye≤yi≤yn1. Similarly, the division line estimation unit 44 sets a candidate point PLBi of the division line LB at a position separated by LLLB(yi) in a positive direction of the x axis from the reference point PLLi on the first road end line LL.

The division line estimation unit 44 approximates the polynomial curve by performing fitting using a least squares method on the basis of the candidate point PLAi of the division line LA in the section of ye≤yi≤yn1 and the division line LA. The division line estimation unit 44 calculates the approximated curve as post-estimation division line. As a result, the extended portion LAE of the division line LA is estimated. Further, the division line estimation unit 44 approximates the polynomial curve by performing fitting using a least squares method on the basis of the candidate point PLBi of the division line LB in the section of ye≤yi≤yn1 and the division line LB. The division line estimation unit 44 calculates the approximated curve as post-estimation division line. As a result, the extended portion LBE of the division line LB is estimated.

In a case where the division line estimation unit 44 estimates the extended portion of the division line on the basis of the second estimation condition, the division line can be detected on the basis of information on the first road end line without using information on the second road end line in a case where at least the first road end line on one side of the road can be detected.

In the above example, in a case where the ratio of the change in distance in the horizontal direction between the road end line and the division line with respect to the distance in the vertical direction is calculated, a distance (second reference distance) in the horizontal direction between the road end line and the division line at the upper end of the first road end line is estimated to be zero. That is, the reference point at the upper end of the first road end line is estimated to correspond to the candidate point of the extended portion of the division line. Therefore, even in a case where the division line detected from the visible image is short, the ratio of the change can be calculated in a case where one reference point can be set on the division line.

Further, in a case where the extended portion of the division line is estimated on the basis of the second estimation condition, the division line estimation unit 44 may calculate a ratio of the change in the distance in the horizontal direction between the road end line and the division line with respect to the distance in the vertical direction using the following method.

The division line estimation unit 44 detects the upper end PLLe of the first road end line LL in a state in which the integrated image is arranged with the downward direction of the vehicle set to a downward direction of the image. Similar to the method described above, the division line estimation unit 44 selects the y coordinate value yn1 such that the straight line Y=yn1 intersects all of the first road end line LL and the division lines LA and LB. In the straight line Y=yn1, the first reference point PLLn1 on the first road end line LL, the first reference point PLAn1 on the division line LA, and the first reference point PLBn1 on the division line LB are specified. The first reference distance LLLA(yn1) between the first reference point PLLn1 of the first road end line LL and the first reference point PLAn1 on the division line LA is calculated, and the first reference distance LLLB(yn1) between the first reference point PLLn1 of the first road end line LL and the first reference point PLBn1 on the division line LB is calculated.

Further, the division line estimation unit 44 selects such a y coordinate value that the straight line Y=yn2 intersects with all of the first road end line LL and the division lines LA and LB, which is a y coordinate value yn2 different from yn1. In the straight line Y=yn2, the second reference point PLLn2 on the first road end line LL, the second reference point PLAn2 on the division line LA, and the second reference point PLBn2 on the division line LB are specified. The division line estimation unit 44 calculates a second reference distance LLLA(yn2) between the second reference point PLLn2 of the first road end line LL and the second reference point PLAn2 on the division line LA, and calculates a second reference distance LLLB(yn2) between the second reference point PLLn2 of the first road end line LL and the second reference point PLBn2 on the division line LB. In this case, yn1>yn2.

As illustrated in FIG. 5B, the division line estimation unit 44 calculates a constant ratio αA=(LLLA(yn1)−LLLA (yn2))/(yn1−yn2) which is a ratio of the difference between the first reference distance LLLA(n1) and the second reference distance LLLA(n2) with respect to the distance (yn1−yn2) in the distance in the vertical direction between the first reference point PLLn1 and the second reference point PLLn2. Further, as illustrated in FIG. 5B, the division line estimation unit 44 calculates a constant ratio αB=(LLLB (yn1)−LLLB(yn2))/(yn1−yn2) which is a ratio of the difference between the first reference distance LLLB(yn1) and the second reference distance LLLB(yn2) with respect to the distance (yn1−yn2) in the distance in the vertical direction between the first reference point PLLn1 and the second reference point PLLn2.

As described above, in a case where reference points corresponding to each other are provided on the road end line LL and on the division line on a plurality of horizontal straight lines, and the ratio of the change in the distance in the horizontal direction between the road end line and the division line with respect to the distance in the vertical direction is calculated in a state in which the integrated image is arranged with a downward direction of the vehicle set to the downward direction of the image, the extended portion of the division line can be estimated by effectively utilizing respective pieces of information of the division lines detected from the visible image.

Here, although two reference points are respectively provided for the road end line and the division line, and the ratio of the change in the distance in the horizontal direction between the first road end line and the division line is obtained, more reference points may be provided for the road end line and the division line, reference points corresponding to each other may be provided on the road end line LL and the division line on three or more horizontal straight lines, and the ratio of the change in the distance in the horizontal direction between the first road end line and the division line may be obtained. In this case, by using more reference points, it is possible to more accurately obtain the ratio of change in the distance.

Here, the division line estimation unit 44 performs the first estimation process in a case where two road end lines indicating both ends of the road are detected. Further, the division line estimation unit 44 performs the second estimation process in a case where a road end line indicating one end of the road is detected and a road end line indicating the other end of the road is not detected. In this case, by using a combination of the first estimation process and the second estimation process according to the number of detected road end lines, it is possible to accurately estimate the extended portion of the division line.

The present invention is not limited thereto and the division line estimation unit 44 may be configured to estimate the extended portion of the division line using only the first estimation condition. Further, the division line estimation unit 44 may be configured to estimate the extended portion of the division line using only the second estimation condition. Further, the division line estimation unit 44 may use an arbitrary scheme of estimating the extended portion of the division line according to the first estimation condition, and may use an arbitrary scheme of estimating the extended portion of the division line according to the second estimation condition.

Figure 6:
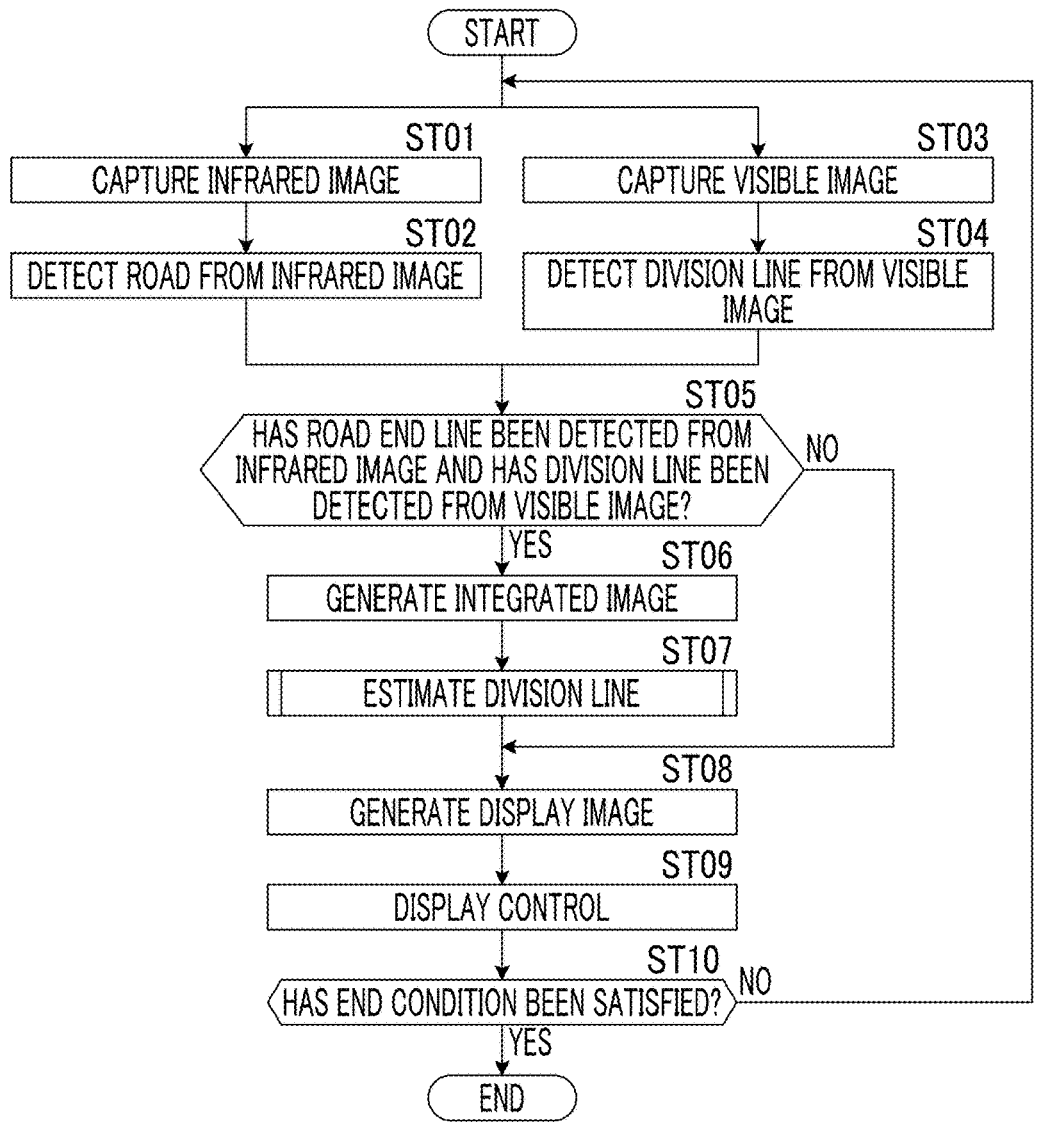
FIG. 6 is a flowchart illustrating a flow of a process in the travel assistance device of the first embodiment.
Figure 7:
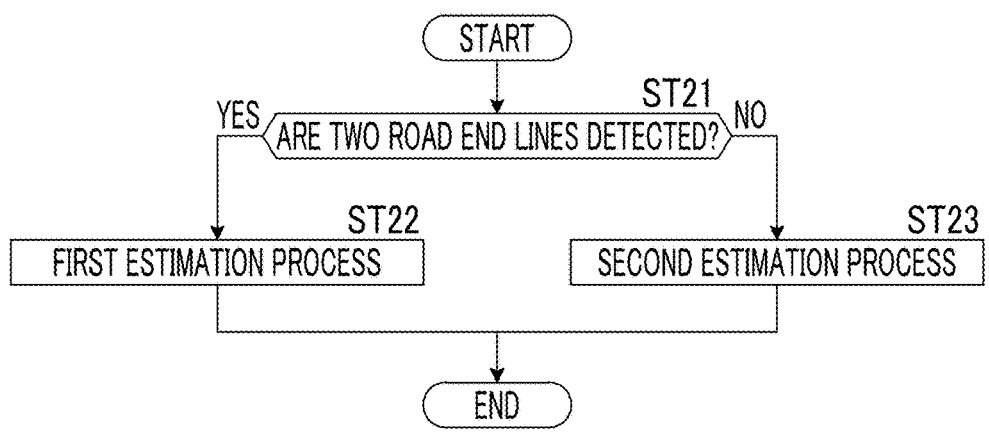
FIG. 7 is a flowchart illustrating a flow of a process in the division line estimation unit.

FIG. 6 is a flowchart illustrating a flow of a process in the travel assistance device 100 of the first embodiment, and FIG. 7 is a flowchart illustrating a flow of a process in the division line estimation unit 44. Hereinafter, the flow of the process in the travel assistance device 100 of the first embodiment will be described in detail with reference to FIGS. 6 and 7.

First, the infrared imaging unit 10 captures an infrared image and stores the captured infrared image in the frame memory 61 (ST01). Then, the road detection unit 41 detects a road end from the infrared image (ST02).

Further, the visible imaging unit 20 captures the visible image in synchronization with the imaging in the infrared imaging unit 10, and stores the captured visible image in the frame memory 62 (ST03). Then, the division line detection unit 42 detects the division line from the visible image (ST04).

Then, the division line estimation unit 44 determines whether a determination condition that at least one road end line has been detected from the infrared image and the division line has been detected from the visible image is satisfied (ST05). In a case where the determination condition is not satisfied (NO in ST05), the image generation unit 43 generates a display image in a preset display aspect (ST08). Here, a superimposed image of the infrared image and the visible image is generated as the display image. The display control unit 31 performs display control to display the generated display image on the display unit 70 (ST09). Further, the travel assistance device 100 determines whether or not the end condition has been satisfied (ST10), and ends a process satisfying the end condition (YES in ST10). In a case where the end condition has not been satisfied (NO in ST10), the processes from ST01 to ST09 are repeated.

On the other hand, in a case where the determination condition is satisfied (YES in ST05), the image generation unit 43 generates the integrated image (ST06). Then, the division line estimation unit 44 performs a division line estimation process (ST07). FIG. 7 illustrates a flow of a process in ST07. As illustrated in FIG. 7, in a case where two road end lines indicating both ends of the road are detected (YES in ST21), the division line estimation unit 44 performs a first estimation process on the basis of the integrated image to estimate the extended portion of the division line (ST22). On the other hand, in a case where two road end lines indicating both ends of the road are not detected (NO in ST21), the division line estimation unit 44 performs a second estimation process on the basis of the integrated image to estimate an extended portion of the division line (ST23).

The image generation unit 43 generates a display image including the road, the division line, and the estimated extended portion of the division line (ST08). Here, the image generation unit 43 generates a superimposed image of the infrared image and the visible image, and generates a display image in which the estimated division line is identified and displayed on the superimposed image. The display control unit 31 causes the display unit 70 to display the generated display image (ST09). Further, the travel assistance device 100 determines whether or not the end condition is satisfied (ST10). In a case where the end condition is satisfied (YES in ST10), the travel assistance device 100 ends the process. In a case where the end condition is not satisfied (NO in ST10), the processes from ST01 to ST09 are repeated.

As described above, according to the embodiment of the present invention, even in a case where the division line having an illuminance lower than the minimum illuminance of the visible imaging unit 20 in the visible image cannot be detected on the basis of the pixel value of the visible image, the road end lines of the road on which the vehicle travels are detected from the infrared image, the division line of the road is detected from the visible image, and an integrated image indicating the road end lines and the division line is generated on the basis of the infrared image and the visible image registered with each other, and the extended portion of the division line in the integrated image is estimated on the basis of the division line and the road end line in the integrated image. Thus, it is possible to suitably estimate the extended portion of the division line.

Further, the division line detection unit 42 approximates the polynomial curve on the basis of the detected candidate points of the road end line, and calculates the approximated curve as the road end line. Further, the division line estimation unit 44 approximates the polynomial curve on the basis of the detected candidate points of the division line, and calculates the approximated curve as the extended portion of the division line. Therefore, even in a case where a road is curved, it is possible to suitably estimate the extended portion of the division line on the basis of the road end line approximated as the polynomial curve. On the other hand, it is conceivable to estimate a straight line obtained by extending a straight line connecting a plurality of boundary line candidates detected from the visible image as the division line using JP2006-185406A and JP2005-316607A.

However, even in this case, in the technologies of JP2006-185406A and JP2005-316607A, it is possible to estimate the division line only in a case where the division line is a straight line.

Figure 8:
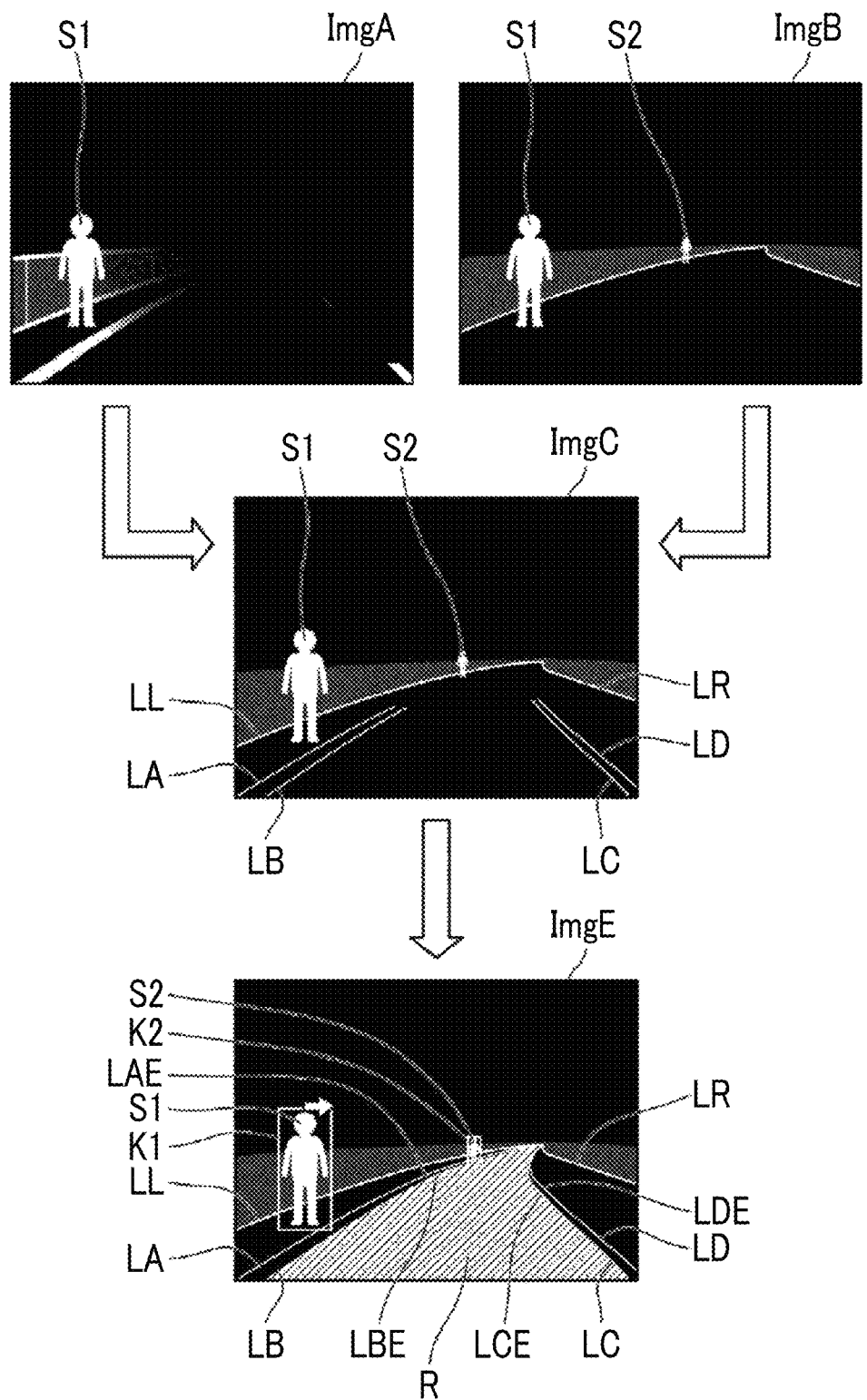
FIG. 8 is a diagram illustrating an image that is generated in a second embodiment.

Hereinafter, a process of the travel assistance device 100 according to a second embodiment will be described with reference to FIGS. 8 to 11. The second embodiment shows an application example of determining the presence or absence of an object that may be an obstacle in a travel lane area using the estimated extended portion of the division line. FIG. 8 illustrates images generated in the second embodiment. FIG. 8 illustrates an infrared image ImgB captured by an infrared imaging unit 10, a visible image ImgA captured by a visible imaging unit 20, an integrated image ImgC that is an image obtained by superimposing the infrared image ImgB and the visible image ImgA, and a display image ImgE generated and displayed through the process according to this embodiment, which will be described below.

Generally, in the case of nighttime or the like, a subject such as a road, a division line, or a person, which is a subject having an illuminance equal to or higher than the minimum illuminance of the visible imaging unit 20 can be identified from the visible image, but a subject having an illuminance lower than the minimum illuminance such as a subject at which light of a headlight does not arrive cannot be identified. On the other hand, information on a person that is an isothermal object and information on the road end lines are obtained regardless of an illuminance from the infrared image.

For example, as illustrated in FIG. 8, it is possible to identify objects S1 and S2 which are persons in the infrared image ImgB. On the other hand, in the visible image ImgA, an object S1 having an illuminance equal to or higher than the minimum illuminance of the visible imaging unit 20 can be identified, but an object S2 having an illuminance lower than the minimum illuminance of the visible imaging unit 20 cannot be detected. In such a case, the presence of the object S2 can be recognized from the infrared image ImgB, but even in a case where the both images of the infrared image ImgB and the visible image ImgA are merely combined, the extended portion of the division line cannot be identified. Therefore, it cannot be discriminated whether the object S2 is outside or inside the division line indicating a boundary of a travel lane area and it is unclear whether or not the object S2 is likely to be an obstacle in the travel lane area.

In view of the above, in the second embodiment, even in a case where there is an object that is detected from the infrared image and cannot be detected in the visible image, the travel lane area of a subject vehicle is set using the estimated extended portion of the division line, the presence or absence of an object which may be an obstacle in the travel lane area is determined, and in a case where there is an object which may be an obstacle, a warning is issued for a user such as a driver.

Figure 9:
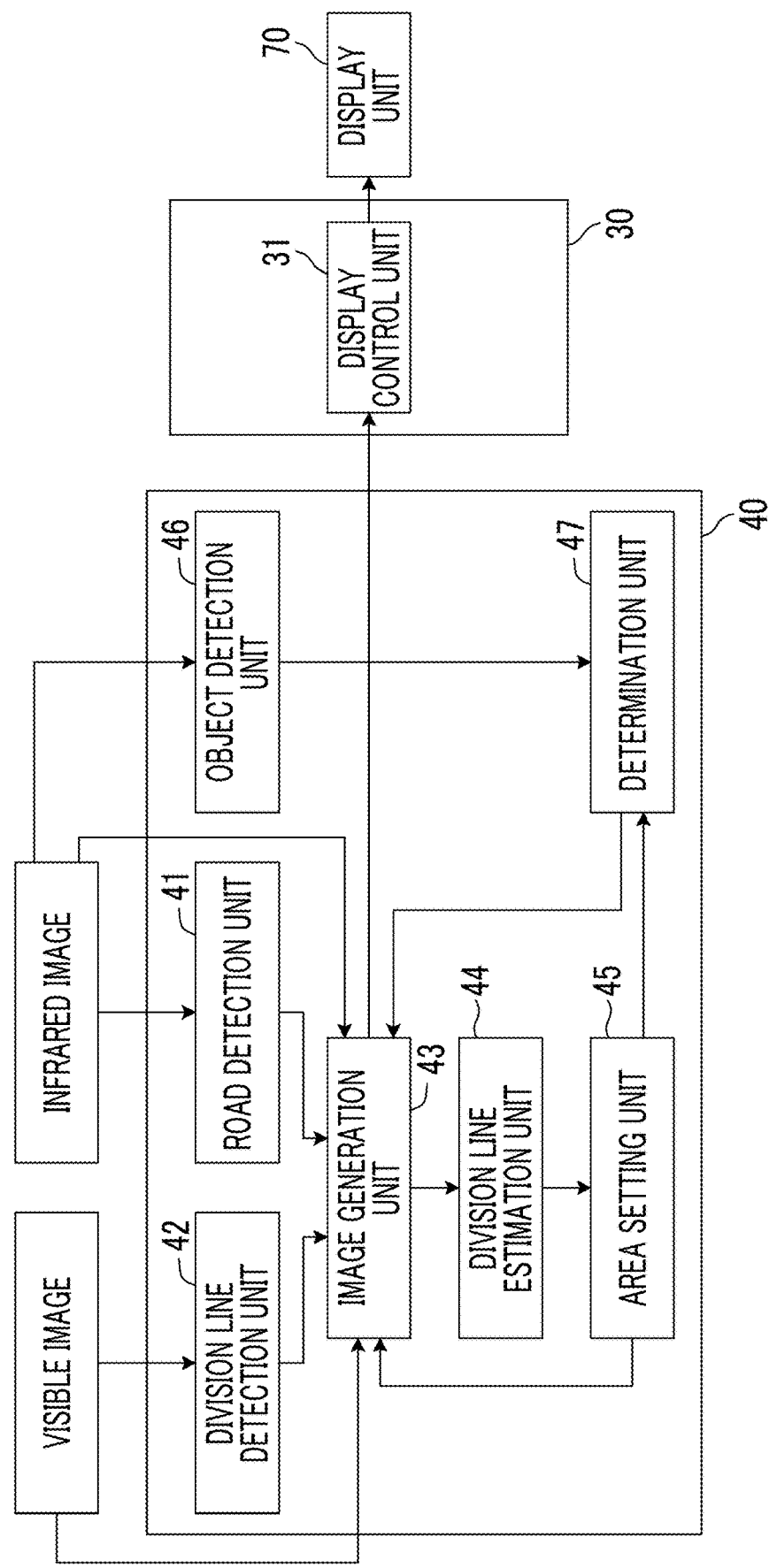
FIG. 9 is a block diagram illustrating a configuration of a digital signal processing unit and a control unit in the second embodiment.

FIG. 9 is a block diagram illustrating a configuration of a digital signal processing unit 40 and a control unit 30 in the second embodiment. In each embodiment below, the same configurations as those of the first embodiment are denoted with the same reference numerals, and description thereof will be omitted.

The second embodiment is different from the first embodiment in that the travel assistance device 100 further includes an area setting unit 45, an object detection unit 46, and a determination unit 47, the display unit 70 functions as a warning unit, and the image generation unit 43 generates a display image with a warning display according to a result of a determination, as illustrated in FIG. 9. Hereinafter, a difference between the second embodiment and the first embodiment will be mainly described, and description of other same units will be omitted.

The area setting unit 45 sets a travel lane area in which the vehicle travels on the road on the basis of the division line, the extended portion of the division line, and the road end line. Te area setting unit 45 specifies a line closest to a right side portion of the vehicle and a line closest to a left side portion of the vehicle from the division line and the road end lines in the integrated image in a state in which the integrated image is arranged with the downward direction of the vehicle set as the downward direction of the image, on the basis of a known positional relationship between the vehicle and the visible imaging unit 20 and the infrared imaging unit 10, and sets an area between the specified two lines as the travel lane area.

The object detection unit 46 detects an isothermal object from the infrared image. Here, the object detection unit 46 detects a pixel set indicating a temperature in a reference range corresponding to a person temperature from the infrared image using a known scheme, and extracts an edge of the detected pixel set. The person is detected from the infrared image by performing pattern recognition on the extracted edge using a pattern indicating a known person shape. Here, although the object detection unit 46 detects the person as an isothermal object from the infrared image, the object detection unit 46 may detect an animal such as a dog together or may be configured to detect only the animal such as the dog.

The display unit 70 also has a function of the warning unit that presents a warning to a user such as a driver of the vehicle. Specifically, the display unit 70 functions as a warning unit by displaying a display image with a warning display.

The warning unit may be configured of an arbitrary device capable of warning a user such as the driver of the vehicle. For example, the warning unit may include a warning lamp that performs a warning, for example, through turning-on or off. Further, the warning unit may include a speaker that performs a warning by generating a warning sound or a warning message. Further, the warning unit may include an arbitrary combination of the speaker, the display unit 70, and the warning lamp, for example.

On the basis of the object detected from the infrared image, the determination unit 47 determines the presence or absence of an object that can become an obstacle in the travel lane area, and determines whether or not a warning is necessary. In a case where the object is not detected from the infrared image, the determination unit 47 determines that a warning is unnecessary.

Further, the determination unit 47 determines whether or not there is an object in the travel lane area on the basis of the relative position information of the travel lane area set in the area setting unit 45 and the object detected by the object detection unit 46, and determines that a warning is necessary in a case where there is the object in the travel lane area. This is because, in a case where there is the object in the travel lane area, the object is highly likely to be an obstacle in the travel lane area, and it is preferable to call attention to the user such as the driver for safe traveling.

In the case where the object is located outside the travel lane area, the determination unit 47 determines calculates a movement direction and a movement speed of the object with respect to the travel lane area on the basis of an infrared moving image which is a time-series infrared image of a predetermined number of frames immediately before the determination. The movement speed and the movement direction of the object are calculated using a known method on the basis of a frame rate and a displacement of a position of the object between the frame images. In the case where the object does not move toward the travel lane area, the determination unit 47 determines that a warning is unnecessary. Thus, in a case where a possibility of the object entering the travel lane area is low, it is possible to suppress an excessive warning not by presenting a warning.

Further, in a case where the object is moving in a direction approaching the travel lane area, the determination unit 47 estimates an entrance time Tp at which the object enters the travel lane area on the basis of the distance between the travel lane area and the object and the movement speed of the object. Further, the determination unit 47 estimates an arrival time Tc at which the vehicle arrives at the position of the object on the basis of the distance between the object and the vehicle and the movement speed of the vehicle. For example, the determination unit 47 may estimate the distance between the object and the vehicle based on a size of the object, on the basis of, for example, information in which the size of the object is associated with the distance between the object and the vehicle in advance, or may calculate the distance between the object and the vehicle using an arbitrary method.

The determination unit 47 determines that a warning is also necessary in a case where the entrance time Tp is before the arrival time Tc. This is because, even in a case where the object is likely to enter the travel lane area before the vehicle arrives at the position of the object (in a case where the object is likely to enter the travel lane area), it is preferable to call attention to the user such as the driver for safe traveling. Further, by determining the object likely to enter the travel lane area using the entrance time Tp and the arrival time Tc, it is possible to suppress an excessive warning not by presenting a warning in a case where the object is less likely to enter the travel lane area.

Since a detection position of the object is displaced from frame to frame in the moving image, the determination unit 47 may calculate the movement direction or the movement speed of the object using a moving image composed of frame images obtained by performing inter-frame smoothing using a plurality of previous and subsequent frames. Further, the determination unit 47 may perform smoothing of the object position and motion prediction by using a known time-series filtering method such as a Kalman filter, and determine whether or not the object is moving toward the travel lane area on the basis of the motion prediction. The present invention is not limited to the embodiment and the determination unit 47 may omit the calculation of the entrance time Tp and the arrival time Tc, and determine that the object is likely to enter the travel lane area in a case where the object is moving toward the travel lane area. Further, the present invention is not limited to the embodiment, and the determination unit 47 may determine that a warning is unnecessary in a case where the object is outside the travel lane area.

In a case where the determination unit 47 determines that a warning is necessary, the determination unit 47 causes the warning unit to present the warning. Here, the determination unit 47 causes the image generation unit 43 to generate a display image with a warning display, and causes the display unit 70 (warning unit) to display the display image with a warning display to present the warning.

In a case where the warning unit includes a speaker, the determination unit 47 presents the warning by transmitting a speaker control instruction to the control unit 30 so that warning sound or a voice message is emitted to the speaker.

Further, in a case where the warning unit includes a warning lamp, the warning unit presents a warning by transmitting a warning lamp control instruction to the control unit 30 so that a turn-on instruction is issued to the warning lamp.

In this embodiment, the determination unit 47 causes the warning to be presented in different aspects in a case where there is an object in the travel lane area and a case where an object located outside the travel lane area is likely to enter the travel lane area. In the case where there is the object in the travel lane area, it is conceivable that the object is more likely to be an obstacle to traveling and it may be better to strongly urge a user such as a driver to pay attention as compared with a case where the object outside the travel lane area is likely to enter the travel lane area. Further, by changing the warning aspect according to the likelihood of the object becoming an obstacle to traveling, it is possible for a relationship between the object and the travel lane area to be recognized by the user in greater detail. The present invention is not limited to the embodiment, and the determination unit 47 may present the warning in the same aspect regardless of the level of the warning.

The determination unit 47 instructs the image generation unit 43 to attach a warning display at a first warning level in a case where there is an object in the travel lane area, and instructs the image generation unit 43 to attach a warning display at a second warning level lower than the first warning level as a warning level in a case where the object present outside the travel lane area is likely to enter the travel lane area. The image generation unit 43 attaches the warning display according to the instruction to generate the display image, and the display control unit 31 causes the display unit 70 to display the generated display image, thereby presenting the warning.

The determination unit 47 may change the warning aspect in an arbitrary method according to the configuration of the warning unit. For example, in a case where the warning is present in different aspects using a speaker, the determination unit 47 may adopt an arbitrary method, such as changing voice message, changing warning sound, or changing the number of repetitions or a volume of a warning message or the like. Further, in the case where the warning is presented in different aspects using a warning lamp, the determination unit 47 may adopt an arbitrary method such as changing a turning-on or off pattern or the number of times of turning-on or off.

The image generation unit 43 generates a display image with a warning display according to a result of a warning requirement determination. FIG. 8 illustrates an example of a display image ImgE with a warning display. The display image ImgE is formed by registering and superimposing the infrared image ImgB and the visible image ImgA, and includes the division lines LA, LB, LC, and LD detected from the visible image ImgA, the road end lines LL and LR detected from the infrared image ImgB, the objects S1 and S2 detected from the infrared image ImgB, and the travel lane area R with a different color from other road areas in a visible manner. The display image ImgE displays a warning against the objects S1 and S2 by attaching rectangular indicators K1 and K2 to the objects S1 and S2 detected from the infrared image ImgB.

The image generation unit 43 may adopt an arbitrary method as a warning display method. For example, the image generation unit 43 may attach a warning message to the display image, and may perform a warning display using a method, such as highlighting using turning-on or off of an object, coloring of an object, or the like, or turning-on or off a part or the whole of a display image.

Further, in a case where the image generation unit 43 performs the warning display, the image generation unit 43 may change a warning display aspect according to an arbitrary method according to the warning level. Here, an indicator K2 having a red frame shape is attached to an object present in the travel lane area and a warning display is performed. An indicator K1 having a yellow frame shape is attached to an object located outside the travel lane area and likely to enter the travel lane area and a warning display is performed. Thus, by displaying the warning display in a stepwise manner using simple indicators with different colors, it is easy for the user to recognize the warning, and it is possible to prevent a display screen from being not viewed due to the warning display. For example, a warning message according to the level of warning may be displayed as a usage method for making an aspect of a warning display different according to the level of warning, and an arbitrary method such as making the number of times of turning-on or off of an indicator attached to the object different may be adopted. Other functions or structures of the image generation unit 43 are the same as those of the first embodiment.

It is preferable for the image generation unit 43 to generate a display image including the travel lane area and the object in a visible manner in the reference coordinate system in which the infrared image and the visible image are registered irrespective of the presence or absence of the warning. In this case, it is possible to present information from which the positional relationship between the travel lane area and the object in the display image can be clearly recognized. Here, in a case where a warning is not necessary, the image generation unit 43 registers and superimposes the infrared image and the visible image, and generates a display image including the division line detected from the visible image, the road end lines detected from the infrared image, the object detected from the infrared image, and the travel lane area in a visible manner. In the embodiment, the display image generated in a case where a warning is necessary and the display image generated in a case where a warning is unnecessary are different only in the presence or absence of an indicator attached around the object determined to be warned.

The image generation unit 43 may use an arbitrary scheme that enables the travel lane area and the object to be identified in a case where the display image is generated. For example, the image generation unit 43 may indicate the travel lane area in the display image identifiably by attaching a different pattern from other areas or may indicate the travel lane area in the display image identifiably by causing an outline of the travel lane area to have a feature, for example, by setting the outline of the travel lane area as a bold outline. Further, the image generation unit 43 may indicate the object in the display image identifiably by attaching a different pattern from other areas or may indicate the object in the display image identifiably by causing an outline of the object to have a feature, for example, by setting the outline of the object area as a bold object.

Figure 10:
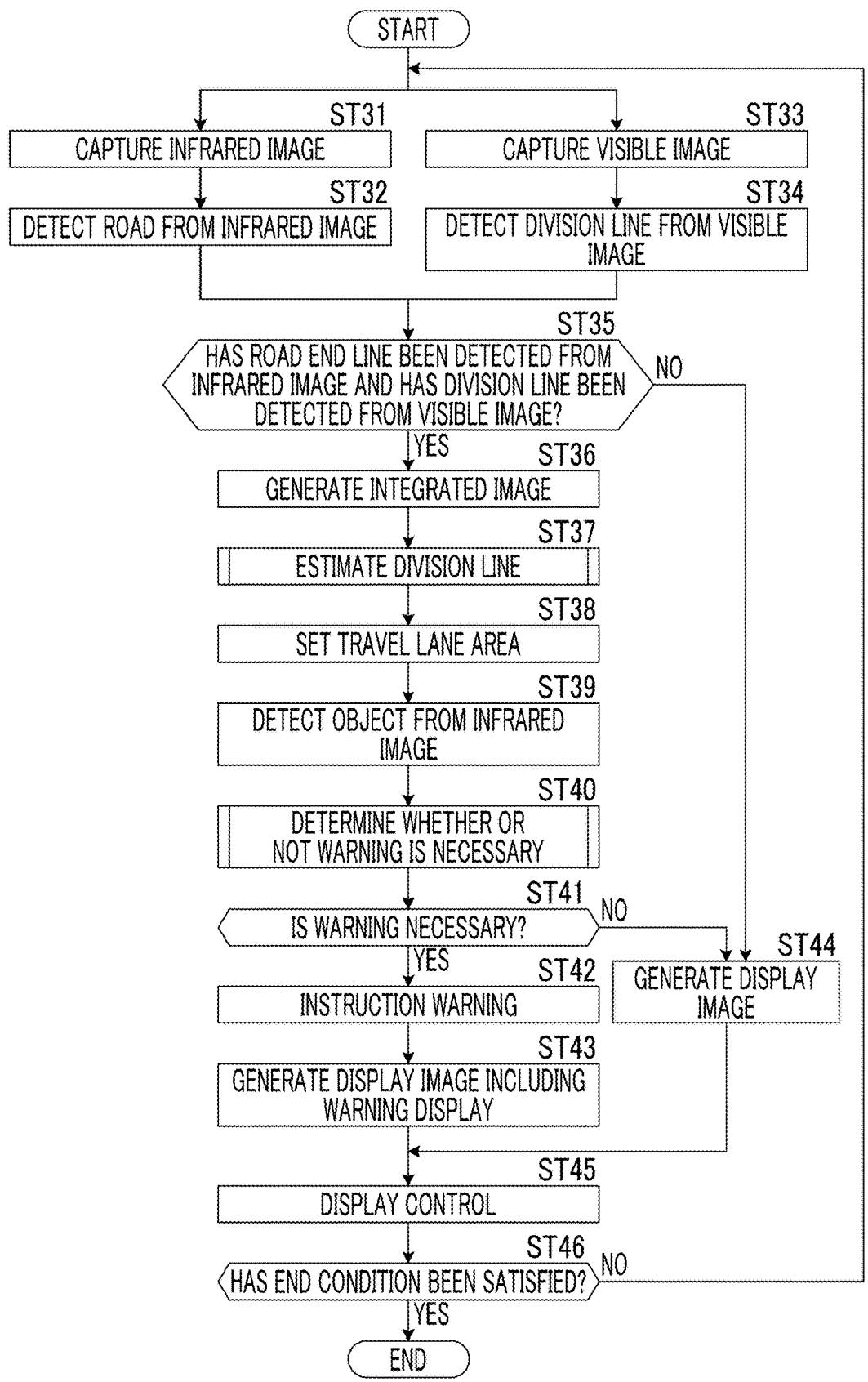
FIG. 10 is a flowchart illustrating a flow of a process in a travel assistance device of the second embodiment.
Figure 11:
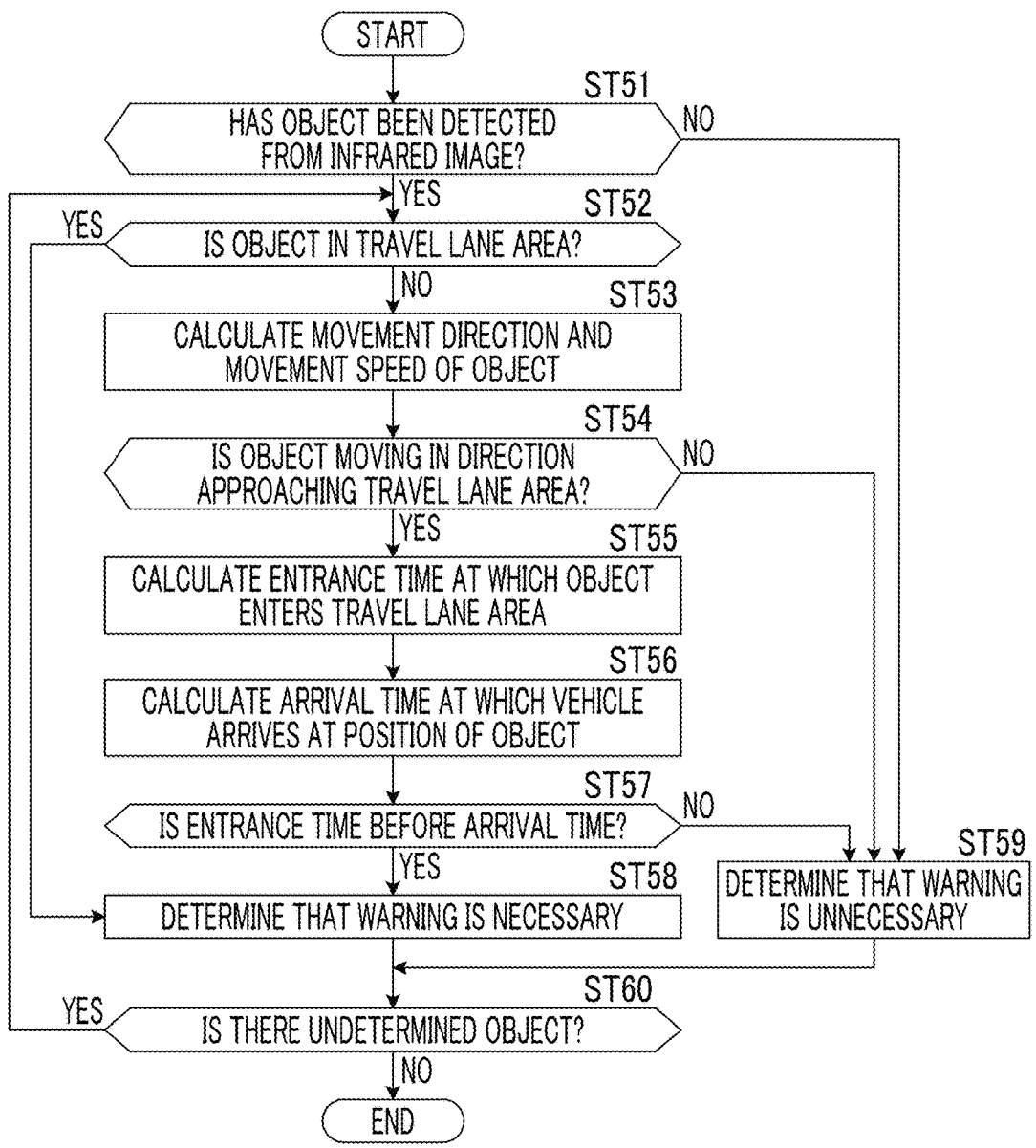
FIG. 11 is a flowchart illustrating a flow of a determination process in FIG. 10.

FIG. 10 is a flowchart illustrating a flow of a process in the travel assistance device 100 according to the second embodiment, and FIG. 11 is a flowchart illustrating a flow of a determination process (ST40 in FIG. 10) of determining whether or not the warning in FIG. 10 is necessary, in detail. A flow of a process of the second embodiment will be described with reference to FIGS. 10 and 11. Since ST31 to ST34, ST35 (in the case of YES), ST36, and ST37 are the same processes as those in ST01 to ST07 in FIG. 6, description thereof will be omitted. In a case where the process of ST37 ends, the area setting unit 45 sets the travel lane area using the integrated image (ST38). The object detection unit 46 detects a person as an isothermal object from the infrared image (ST39). The process of ST39 may be performed at an arbitrary timing as long as the process is performed after the process of ST31 (after capturing of the infrared image) and prior to the process of ST40. Then, the determination unit 47 determines whether or not a warning is necessary (ST40).

A process in which the determination unit 47 determines whether or not a warning is necessary will be described in detail with reference to FIG. 11. The determination unit 47 determines presence or absence of an object from the infrared image (ST51). In a case where there is no object in the infrared image (NO in ST51), the determination unit 47 determines that the warning is unnecessary (ST59).

In a case where there is an object in the infrared image (YES in ST51), the determination unit 47 determines whether or not there is the object in the travel lane area (ST52), and in a case where there is the object in the travel lane area (YES in ST52), the determination unit 47 determines that a warning is necessary (ST58).

On the other hand, in a case where there is no object in the travel lane area (NO in ST52), the determination unit 47 calculates the movement direction and the movement speed with respect to the travel lane area (ST53). The determination unit 47 determines whether or not the object is moving in a direction approaching the travel lane area (ST54). In a case where the object is not moving in the direction approaching the travel lane area (NO in ST54), a warning is unnecessary (ST59).

Further, in a case where the object is moving in the direction approaching the travel lane area (YES in ST54), the determination unit 47 calculates the entrance time Tp at which the object enters the travel lane area (ST55). Further, the determination unit 47 calculates the arrival time Tc at which the vehicle arrives at the position of the object (ST56). The processes of ST55 and ST56 may be performed at the same time, or may be sequentially performed. In a case where the entrance time Tp is before the arrival time Tc (YES in ST57), the determination unit 47 determines that a warning is necessary (ST58). In a case where the entrance time Tp is after the arrival time Tc (NO in ST57), the determination unit 47 determines that a warning is unnecessary (ST59).

After the process of determining that the warning is necessary (ST58) and the process of determining that the warning is unnecessary (ST59), in a case where there is an undetermined object for which it has not yet been determined whether or not the warning is necessary (YES in ST60), the determination unit 47 repeats the processes of S51 to S59 for the undetermined object. In a case where it has been determined whether or not the warning is necessary for each of the detected objects (NO in ST60), the process of determining whether or not the warning is necessary ends.

Referring back to FIG. 10, a subsequent process will be described. In a case where the determination unit 47 determines that a warning is necessary for at least one or more objects (YES in ST41), the determination unit 47 instructs the image generation unit 43 to generate a display image including a warning display (ST42). The image generation unit 43 generates a display image to which a warning display is attached according to the instruction (ST43).

Further, in a case where the determination unit 47 determines that the warning is unnecessary (NO in ST41), the image generation unit 43 generates a display image in a preset display aspect (ST44). Here, as the display image, the infrared image and the visible image are registered and superimposed, and an image including the division line detected from the visible image, the road end lines detected from the infrared image, the object detected from the infrared image in a case where there is the object, and the travel lane area with color different from those of other road areas in a visible manner is generated as the display image. Further, in a process (ST35) of determining whether or not a determination condition that at least one road end line has been detected from the infrared image and the division line has been detected from the visible image is satisfied, even in a case where the determination condition is not satisfied (NO in ST35), the image generation unit 43 generates the display image in a preset display aspect (ST44). Here, a superimposed image of the infrared image and the visible image is displayed.

The display control unit 31 causes the display unit 70 to display the generated display image (ST45). Further, the travel assistance device 100 determines whether or not the end condition is satisfied (ST46). In a case where the end condition is satisfied (YES in ST46), the travel assistance device 100 ends the process. In a case where the end condition is not satisfied (NO in ST46), the processes from ST31 to ST45 are repeated.

According to the second embodiment, the travel lane area of the subject vehicle is set using the division line and the estimated extended portion of the division line, and in a case where there is the object in the travel lane area, a warning can be presented to a user such as a driver. Therefore, even in a case where there is an object that is detected from the infrared image and cannot be detected in the visible image, it is possible to determine a positional relationship between the object and the travel lane area and cause the user to easily recognize an object likely to be an obstacle at the time of traveling. Further, it is possible to arouse a user's attention only in a case where there is an object that may be an obstacle in traveling of the vehicle by suppressing an excessive warning.

Figure 12:
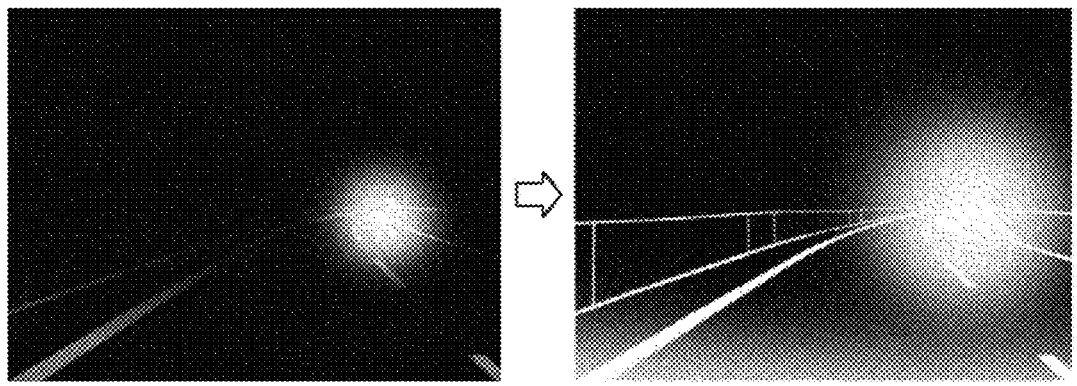
FIG. 12 is a diagram illustrating a visible image after an exposure correction process based on a general-purpose exposure parameter and a visible image after the exposure correction process based on an exposure parameter set according to a third embodiment.

An application example in which exposure correction of a visible image is performed using information on an estimated extended portion of the division line as a third embodiment will be described. FIG. 12 illustrates a visible image (a left image in FIG. 12) after an exposure correction process based on a general-purpose exposure parameter and a visible image (a right image in FIG. 12) after the exposure correction process based on an exposure parameter set according to the third embodiment. The left image and the right image in FIG. 12 are examples in which the exposure correction has been performed on the same visible image with a different exposure parameter.

In the left image in FIG. 12, the exposure parameter is set using an average value of pixel values of the entire visible image as an evaluation value with a uniform weight through a general-purpose automatic exposure correction process. Further, in the general-purpose automatic exposure correction, the exposure parameter may be set so that the visible image center area is appropriately exposed. As shown in the left image in FIG. 12, according to the general-purpose exposure control, for example, in a case where a headlight of an oncoming vehicle or the like is included in the visible image, irradiation light from the headlight may affect the pixel set having a large pixel value, and an unexpected exposure parameter may be set such that a travel lane area to be observed has a remarkably small pixel value.

Figure 13:
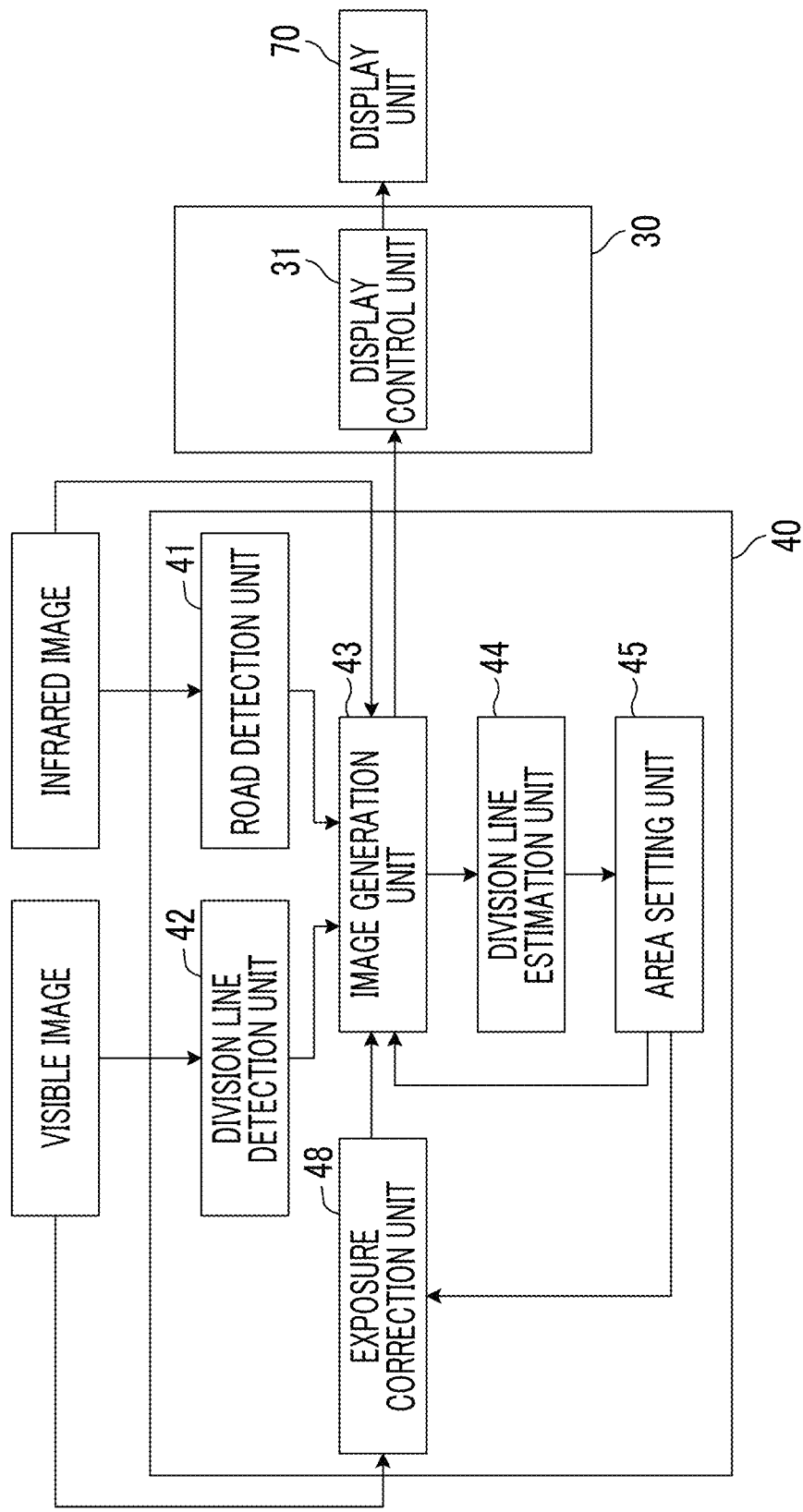
FIG. 13 is a block diagram illustrating a configuration of a digital signal processing unit and a control unit in the third embodiment.
Figure 14:
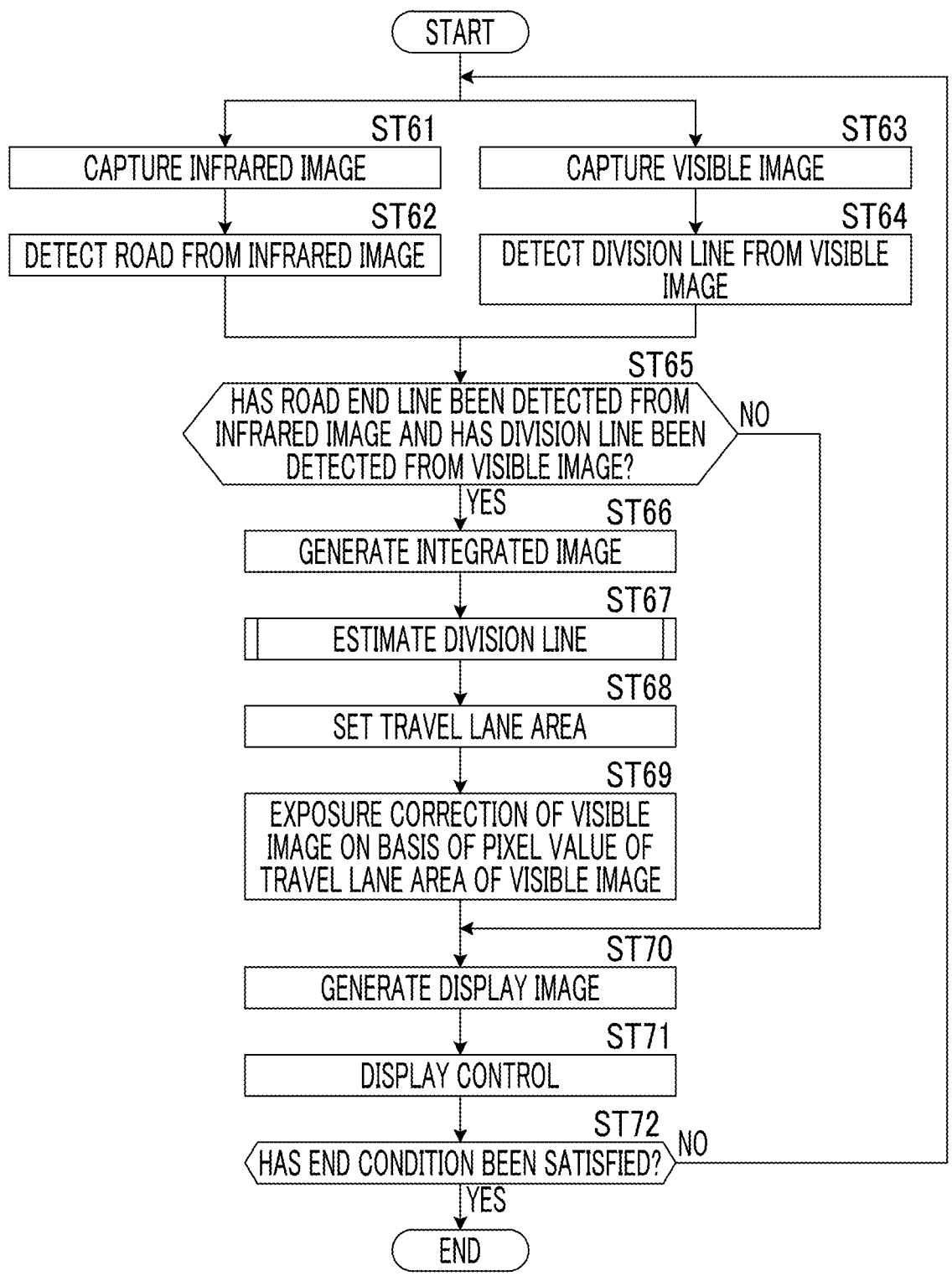
FIG. 14 is a flowchart illustrating a flow of a process in a travel assistance device of the third embodiment.

In the third embodiment, in order to avoid a problem in that the exposure parameter is set such that appropriate exposure of the travel lane area is obtained due to a fluctuation of the pixel value in the visible image as described above, exposure correction of the visible image is performed using information on the estimated extended portion of the division line. FIG. 13 is a block diagram illustrating a configuration of the digital signal processing unit 40 and the control unit 30 in the third embodiment, and FIG. 14 is a flowchart illustrating a flow of a process in the travel assistance device 100 of the third embodiment.

As illustrated in FIG. 13, the third embodiment differs from the first embodiment in that the travel assistance device 100 includes an area setting unit 45 that sets the travel lane area in which the subject vehicle travels on the basis of the division line, the extended portion of the division line, and the road end line, and an exposure correction unit 48 that performs exposure correction so that the travel lane area is appropriately exposed, and the image generation unit 43 acquires the processed visible image on which the exposure correction is performed using the set exposure parameter, and generates a display image on the basis of the processed visible image. Since the area setting unit 45 in the third embodiment has the same configuration and function as the area setting unit 45 in the second embodiment, detailed description thereof will be omitted. Hereinafter, difference between the third embodiment and the first embodiment will be mainly described, and description of other same units will be omitted.

The exposure correction unit 48 performs the exposure correction process for the visible image on the basis of the pixel values of the travel lane area in the visible image. Here, the exposure correction unit 48 calculates the evaluation value of the pixel values of the visible image on the basis of the pixel value of the travel lane area in the visible image, sets the exposure parameter according to the evaluation value, and performs the exposure correction. An exposure table in which the exposure parameter is associated with each evaluation value is stored in the memory 60 in advance.

The exposure correction unit 48 may use an arbitrary method of calculating an evaluation value of the pixel value of the visible image on the basis of the pixel value of the travel lane area in the visible image. For example, the exposure correction unit 48 may calculate the evaluation value by selectively using pixel values of arbitrary pixels in the travel lane area, or may calculate the evaluation value using the pixel values of all the pixels in the travel lane area. For example, the exposure correction unit 48 may calculate, as the evaluation value, any one of a most frequent value, a median value, and an average value using a pixel value histogram of the travel lane area. In this case, it is possible to improve visibility of the travel lane area in the display image on the basis of the post-processing visible image in which the travel lane area is suitably exposed on average, as illustrated in the right drawing of FIG. 12.

For example, the exposure correction unit 48 may calculate the pixel value at the upper end of the road end line detected from the infrared image as an evaluation value. Further, the exposure correction unit 48 may calculate the pixel value of an intersection of the two road end lines detected from the infrared image as the evaluation value. Further, the exposure correction unit 48 may weight the pixel value of the pixel in the travel lane area so that the weight is heavier for the pixel closer to the intersection of the two road end lines or the upper end of the road end line, and calculate the weighted average value as an evaluation value. In this case, the exposure correction can be performed by setting the exposure parameter so that a point furthest from the vehicle in the traveling direction of the road in the travel lane area is suitably exposed. Therefore, it is possible to improve the visibility of the travel lane area of the visible image with the travel lane area set to be suitably exposed in the traveling direction.

Further, in a case where the travel lane area is within a range in which the travel lane area can be appropriately exposed, the exposure correction unit 48 may calculate the evaluation value using not only the pixel value of the pixel in the travel lane area but also the pixel value of the pixel outside the travel lane area, and set the exposure parameter on the basis of the evaluation value. In this case, setting the weight of the pixel value of the travel lane area to be larger than the weight of the pixel value outside the travel lane area is conceivable.

Further, the exposure correction unit 48 may perform the exposure correction only on the travel lane area in the visible image using the exposure parameter set on the basis of the evaluation value, or may perform the exposure correction on the entire visible image.

The image generation unit 43 acquires the processed visible image on which the exposure correction has been performed using the set exposure parameter, and generates a display image on the basis of the processed visible image. The image generation unit 43 may generate a display image by performing arbitrary image processing using the visible image as long as the image generation unit generates the display image on the basis of the processed visible image. For example, the image generation unit 43 may set the processed visible image as a display image or may set a superimposed image obtained by registering the processed visible image and the infrared image as a display image. Other functions or structures of the image generation unit 43 are the same as those of the first embodiment.

Next, a flow of a process of the travel assistance device 100 of the third embodiment will be described with reference to FIG. 14. Since ST61 to ST64, ST65 (in the case of YES), ST66 and ST67 are the same processes as those of ST01 to ST07 in FIG. 6, description thereof will be omitted.

In a case where the extended portion of the division line is estimated, the area setting unit 45 sets the travel lane area (ST68). The exposure correction unit 48 calculates the most frequent value of the pixel value of the travel lane area using a pixel value histogram of the travel lane area. Using the calculated most frequent value as an evaluation value, an exposure parameter of the visible image corresponding to the evaluation value is set. The exposure correction of the visible image is performed using the set exposure parameter, and a visible image after processing is output (ST69).

Subsequently, the image generation unit 43 generates a display image on the basis of the processed visible image (ST70), and the display control unit 31 causes the display unit 70 to display the generated display image (ST71). A process (ST65) of determining whether or not a determination condition that at least one road end line has been detected from the infrared image and the division line has been detected from the visible image is satisfied, in a case where the determination condition is not satisfied (NO in ST65), the image generation unit 43 generates a display image in a preset display aspect (ST70). Here, a superimposed image of the infrared image and the visible image is displayed. Further, the travel assistance device 100 determines whether or not the end condition is satisfied (ST72). In a case where the end condition is satisfied (YES in ST72), the process ends. In a case where the end condition is not satisfied (NO in ST72), the processes from ST61 to ST71 are repeated.

According to the third embodiment, since the travel lane area is set using the information on the estimated extended portion of the division line and the exposure parameter is set on the basis of the pixel value of the travel lane area, the exposure condition of the visible imaging unit 20 can be set so that the travel lane area is appropriately exposed. Further, by setting the exposure parameter using the evaluation value calculated from pixels in the travel lane area or the evaluation value weighted so that the weight of the pixel value of the pixel in the travel lane area increases as the evaluation value of the pixel value of the travel lane area, it is possible to prevent inappropriate exposure correction from being made in the travel lane area due to a fluctuation of pixel values of an area other than the travel lane area. As a result, even in a case where the headlight of the oncoming vehicle or the like is included in the visible image as shown in the right image of FIG. 12, the exposure correction can be performed so that the travel lane area to be observed is appropriately exposed.

As a fourth embodiment, an application example in which the exposure control of the visible image is performed using the information on the estimated extended portion of the division line is shown. In a general-purpose automatic exposure control process, for example, the exposure condition may be set using the average value of the pixel values of the entire visible image as an evaluation value, or a weight may be applied so that a central area of the visible image is appropriately exposed on the basis of the pixel value of the visible image, the evaluation value may be calculated, and the exposure condition may be set using the calculated evaluation value. According to such general-purpose exposure control, for example, in a case where a headlight of an oncoming vehicle is included in the visible image, irradiation light from the headlight may affect the pixel set having a large pixel value, and an unintended exposure condition may be set such that a travel lane area to be observed has a remarkably small pixel value. In view of such problems, the fourth embodiment aims at setting appropriate exposure conditions for the travel lane area.

Figure 15:
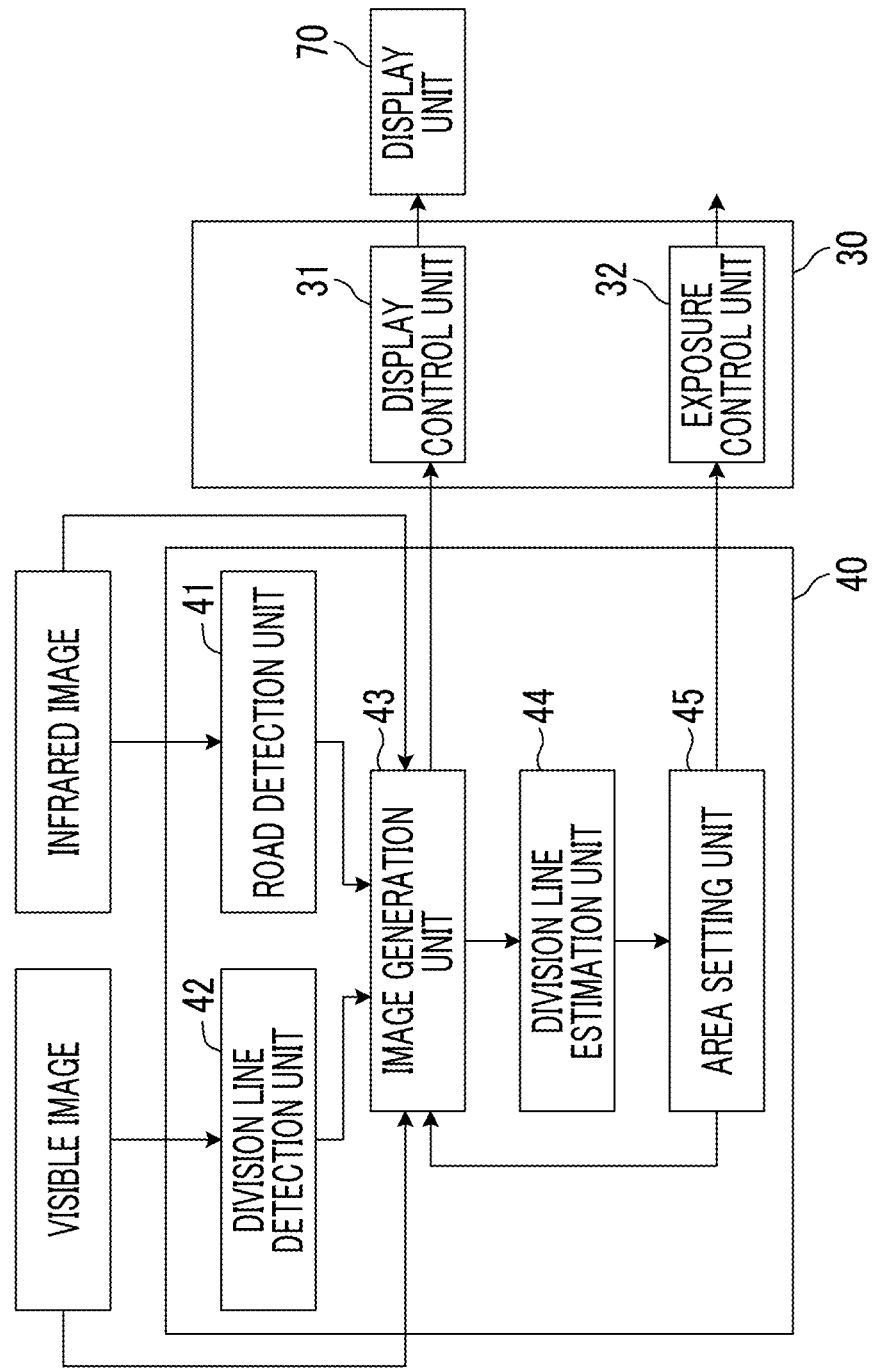
FIG. 15 is a block diagram illustrating a configuration of a digital signal processing unit and a control unit in a fourth embodiment.

In the fourth embodiment, in order to avoid a problem that the exposure condition is set such that the travel lane area is not appropriately exposed due to the fluctuation of the pixel value in the visible image as described above, the exposure correction of the visible image is performed by using the information on the estimated extended portion of the division line. FIG. 15 is a block diagram illustrating a configuration of the digital signal processing unit 40 and the control unit 30 in the fourth embodiment, and FIG. 16 is a flowchart illustrating a flow of a process in the travel assistance device 100 of the fourth embodiment.

The fourth embodiment differs from the first embodiment in that the travel assistance device 100 includes an area setting unit 45 that sets the travel lane area in which the subject vehicle travels on the basis of the division line, the extended portion of the division line, and the road end line, and an exposure control unit 32 that performs exposure control so that the travel lane area is set as appropriate exposure, and the control unit 30 performs capturing of the visible image under exposure conditions set through exposure control. Since the area setting unit 45 in the fourth embodiment has the same configuration and function as the area setting unit 45 in the second embodiment, detailed description thereof will be omitted. Hereinafter, difference between the fourth embodiment and the first embodiment will be mainly described, and description of other same units will be omitted.

The exposure control unit 32 performs exposure control of the visible imaging unit 20 on the basis of the pixel value of the travel lane area in the visible image. The exposure control unit 32 calculates the evaluation value of the pixel value of the visible image on the basis of the pixel value of the travel lane area in the visible image, and sets the exposure condition corresponding to the calculated evaluation value. An exposure condition table in which an exposure condition such as an F value and a shutter speed is associated with each evaluation value is stored in the memory 60 in advance.

The exposure control unit 32 may use an arbitrary method of calculating an evaluation value of the pixel value of the visible image on the basis of the pixel value of the travel lane area in the visible image. For example, the exposure control unit 32 may selectively use pixel values of arbitrary pixels in the travel lane area to calculate the evaluation value, or may calculate the evaluation value using the pixel values of all the pixels in the travel lane area. For example, the exposure control unit 32 may calculate, as the evaluation value, any one of a most frequent value, a median value, and an average value using a pixel value histogram of the travel lane area. In this case, it is possible to improve visibility of the travel lane area in the display image by suitably exposing the travel lane area on average.

For example, the exposure control unit 32 may calculate the pixel value at the upper end of the road end line detected from the infrared image as an evaluation value. Further, the exposure correction unit 48 may calculate the pixel value of an intersection of the two road end lines detected from the infrared image as the evaluation value. Further, the exposure correction unit 48 may weight the pixel value of the pixel in the travel lane area so that the weight is heavier for the pixel closer to the intersection of the two road end lines or the upper end of the road end line, and calculate the weighted average value as an evaluation value. In this case, since the exposure condition can be set so that a point furthest from the vehicle in the traveling direction of the road in the travel lane area is suitably exposed, it is possible to improve visibility of the travel lane area in the visible image by setting the travel lane area to be appropriately exposed in the traveling direction.

Further, in a case where the travel lane area is within a range in which the travel lane area can be appropriately exposed, the exposure control unit 32 may calculate the evaluation value using not only the pixel value of the pixel in the travel lane area but also the pixel value of the pixel outside the travel lane area, and set the exposure condition on the basis of the evaluation value. In this case, setting the weight of the pixel value of the travel lane area to be larger than the weight of the pixel value outside the travel lane area is conceivable.

A flow of a process of the travel assistance device 100 of the fourth embodiment will be described with reference to FIG. 16. Since processes shown in ST81 to ST84, ST85 (in the case of YES), ST86, ST87 in FIG. 16 correspond to the processes shown in ST01 and ST07 in FIG. 6, respectively, description thereof will be omitted.

In a case where the extended portion of the division line is estimated, the area setting unit 45 sets the travel lane area (ST88). The image generation unit 43 generates a display image in a preset display aspect (ST89). Here, the image generation unit 43 generates a display image in which the infrared image and the visible image are superimposed so that the extended portion of the division line, the division line, and the road end are visible. Further, in a process (ST85) of determining whether or not a determination condition that at least one road end line has been detected from the infrared image and the division line has been detected from the visible image is satisfied, even in a case where the determination condition is not satisfied (NO in ST85), the image generation unit 43 generates the display image in a preset display aspect (ST89). Here, the superimposed image of the infrared image and the visible image is displayed. The display control unit 31 causes the display unit 70 to display the generated display image (ST90).

The travel assistance device 100 determines whether or not the end condition is satisfied (ST91), and in a case where the end condition is satisfied (YES in ST91), the process ends. In a case where the end condition is not satisfied (NO in ST91), exposure control is performed (ST92). Specifically, the most frequent value of the pixel value of the travel lane area is calculated on the basis of the pixel value histogram of the travel lane area of the visible image captured immediately before, and the exposure condition is set on the basis of the associated table using the calculated most frequent value as the evaluation value. The travel assistance device 100 repeats the processes from ST81 to ST91. In ST83, the control unit 30 performs capturing of the visible image on the basis of the exposure condition set in the exposure control unit 32.

According to the fourth embodiment, since the travel lane area is set using the information on the estimated extended portion of the division line and the exposure condition is set on the basis of the pixel value of the travel lane area, the exposure condition of the visible imaging unit 20 can be set so that the travel lane area is appropriately exposed. Further, by setting the exposure condition using the evaluation value calculated from pixels in the travel lane area or the evaluation value weighted so that the weight of the pixel value of the pixel in the travel lane area increases as the evaluation value of the pixel value of the travel lane area, it is possible to suppress an influence of a fluctuation of a pixel value of an area other than the travel lane area and set the appropriate exposure condition according to the travel lane area. As a result, by performing capturing of the visible image on the basis of the exposure condition set according to the fourth embodiment, it is possible to enhance the visibility of the travel lane area in the visible image.

In each embodiment in the present specification, the digital signal processing unit 40 functions as the road detection unit 41, the division line detection unit 42, the image generation unit 43, the division line estimation unit 44, the area setting unit 45, the object detection unit 46, the determination unit 47, and the exposure correction unit 48, and the control unit 30 functions as the display control unit 31 and the exposure control unit 32. However, the present invention is not limited thereto, and one of the digital signal processing unit 40 and the control unit 30 may independently have functions of the respective units. Further, the digital signal processing unit 40 and the control unit 30 may share the functions of the respective units in an arbitrary division method. Further, the digital signal processing unit 40 and the control unit 30 may be mounted as one chip or may be mounted as different chips. Further, the memory 60 may be mounted in an arbitrary aspect as long as a required function is realized.

Each of the above embodiments is merely an example, and all of the above description should not be used to restrictively interpret a technical scope of the present invention. The aspects of the present invention are not limited to the individual embodiments (the first to fourth embodiments, other modifications, and application examples). Any combination of the respective elements of each embodiment is also included in the present invention, and various modifications that can be conceived by those skilled in the art are also included in the present invention. That is, various additions, modifications, and partial deletions can be performed without departing from the conceptual idea and gist of the present invention derived from the content defined in the claims and equivalents thereof.

A travel assistance device according to other aspect, comprises: a road detection unit that obtains an infrared image in front of a vehicle from an infrared imaging unit that is mounted on the vehicle, and detects a road end line of a road on which the vehicle travels from the infrared image; a division line detection unit that obtains a visible image in a range corresponding to a range indicated by the infrared image from a visible imaging unit that is mounted on the vehicle, and detects a division line of the road from the visible image; an image generation unit that generates an integrated image indicating the road end line and the division line on the basis of the infrared image and the visible image registered with each other; and a division line estimation unit that estimates an extended portion of the division line in the integrated image on the basis of the division line and the road end line in the integrated image.

A travel assistance method that is performed by a travel assistance device according to other aspect, the travel assistance method comprises: an infrared imaging step of obtaining an infrared image in front of a vehicle from an infrared imaging unit that is mounted on the vehicle; a visible imaging step of obtaining a visible image in a range corresponding to a range indicated by the infrared image from a visible imaging unit that is mounted on the vehicle; a road detection step of detecting a road end line of a road on which the vehicle travels from the obtained infrared image; a division line detection step of detecting a division line of the road from the obtained visible image; an image generation step of generating an integrated image indicating the road end line and the division line on the basis of the infrared image and the visible image registered with each other; and a division line estimation step of estimating an extended portion of the division line in the integrated image on the basis of the division line and the road end line in the integrated image.

What is claimed is:

1. A travel assistance device comprising:
    a digital signal processor configured to:
        obtain an infrared image in front of a vehicle from an infrared imaging unit that is mounted on the vehicle, and detect a road end line of a road on which the vehicle travels from the infrared image;
        obtain a visible image in a range corresponding to a range indicated by the infrared image from a visible imaging unit that is mounted on the vehicle, and detect a division line of the road from the visible image;
        generate an integrated image indicating the road end line and the division line on the basis of the infrared image and the visible image registered with each other; and
        estimate an extended portion of the division line in the integrated image on the basis of the division line and the road end line in the integrated image,
    wherein the digital signal processor further configured to:
        generate a first integrated image which is a two-dimensional image indicating the road end line and the division line as the integrated image on the basis of the infrared image and the visible image registered with each other;
        calculate an internal division ratio at which a reference point on one of two road end lines and a reference point on the other of the two road end lines are internally divided by a reference point on the division line on a line extending in a horizontal direction of the first integrated image in a state in which the first integrated image is arranged with a downward direction of the vehicle set as a downward direction of the image in a case where the two road end lines respectively indicating both ends of the road are detected;
        calculate respective candidate points of the division lines according to a condition that a point on the one road end line, a point on the other road end line, and a point on the division line maintain the internal division ratio on a line extending in the horizontal direction passing through each point from each reference point to an intersection point of the two road end lines; and
        estimate the extended portion of the division line on the basis of the calculated candidate points of the division lines.

2. The travel assistance device according to claim 1, wherein the digital signal processor further configured to:
    calculate respective second candidate points of the division lines corresponding to respective points of the road end lines according to a condition that a distance in the horizontal direction between the road end line and the division line increases at a constant ratio as a distance in a vertical direction from an upper end of the road end line increases in a state in which the first integrated image is arranged with a downward direction of the vehicle set as a downward direction of the image in a case where a road end line indicating one end of the road is detected and a road end line indicating the other end of the road is not detected, and
    estimate the extended portion of the division line on the basis of the second calculated candidate points of the division lines.

3. The travel assistance device according to claim 1, wherein the digital signal processor further configured to:
    detect a plurality of candidate points indicating the road end line, and approximate the road end line as a polynomial curve on the basis of the plurality of detected candidate points, and
    approximate the division line as a polynomial curve on the basis of the candidate points of the division line.

4. The travel assistance device according to claim 1, wherein the digital signal processor further configured to generate a display image indicating the division line, the extended portion of the division line, and the road end line, and
    the travel assistance device further comprises a controller which displays the generated display image on a display screen.

5. The travel assistance device according to claim 1, further comprising:
    a controller configured to present a warning for a driver of the vehicle,
    wherein the digital signal processing unit further configured to:
        set a travel lane area of the road in which the vehicle travels, on the basis of the division line, the extended portion of the division line, and the road end line;
        detect an isothermal object from the infrared image; and
        determine presence or absence of the object in the travel lane area and causes the controller to present a warning in a case where there is the object.

6. The travel assistance device according to claim 5,
wherein the digital signal processing unit further configured to:
estimate an entrance time at which the object enters the travel lane area on the basis of a distance between the travel lane area and the object and a movement speed of the object,
estimate an arrival time at which the vehicle arrives at the position of the object on the basis of a distance between the object and the vehicle and a movement speed of the vehicle, and
cause the controller to present a warning in a case where the entrance time is before the arrival time.

7. The travel assistance device according to claim 1,
wherein the digital signal processor further configured to set a travel lane area of the road in which the vehicle travels, on the basis of the division line, the extended portion of the division line, and the road end line; and
the travel assistance device further comprises a controller configured to perform an exposure correction process for the visible image on the basis of pixel values of the travel lane area in the visible image.

8. The travel assistance device according to claim 1, further comprising:
wherein the digital signal processor further configured to set a travel lane area of the road in which the vehicle travels, on the basis of the division line, the extended portion of the division line, and the road end line; and
the travel assistance device further comprises a controller configured to perform exposure control of the visible imaging unit on the basis of pixel values of the travel lane area in the visible image.

9. A travel assistance device comprising:
a digital signal processor configured to:
obtain an infrared image in front of a vehicle from an infrared imaging unit that is mounted on the vehicle, and detect a road end line of a road on which the vehicle travels from the infrared image;
obtain a visible image in a range corresponding to a range indicated by the infrared image from a visible imaging unit that is mounted on the vehicle, and detect a division line of the road from the visible image;
generate an integrated image which is a two-dimensional image indicating the road end line and the division line on the basis of the infrared image and the visible image registered with each other; and
estimate an extended portion of the division line in the integrated image on the basis of the division line and the road end line in the integrated image,
wherein the digital signal processor further configured to:
generate a second integrated image which is a two-dimensional image indicating the road end line and the division line as the integrated image on the basis of the infrared image and the visible image registered with each other;
calculate respective candidate points of the division lines corresponding to the respective points of the road end lines according to a condition that a distance in the horizontal direction between the road end line and the division line increases at a constant ratio as a distance in a vertical direction from an upper end of the road end line increases in the second integrated image in a state in which the second integrated image is arranged with a downward direction of the vehicle set as a downward direction of the image; and
estimate the extended portion of the division line on the basis of the calculated candidate points of the division lines.

10. The travel assistance device according to claim 9,
wherein the digital signal processor further configured to:
detect an upper end of the road end line in a state in which the integrated image is arranged with the downward direction of the vehicle set as the downward direction of the image;
calculate a first reference distance in the horizontal direction from a reference point of the road end line to the division line;
set a second reference distance in the horizontal direction from the upper end to the extended portion of the division line to zero;
calculate the constant ratio on the basis of a ratio of a difference between the first reference distance and the second reference distance with respect to a distance in the vertical direction from the reference point of the road end line to the upper end; and
estimate the extended portion of the division line on the basis of the calculated candidate points of the division lines.

11. The travel assistance device according to claim 9,
wherein the digital signal processor further configured to:
detect an upper end of the road end line in a state in which the integrated image is arranged with the downward direction of the vehicle set as the downward direction of the image;
calculate a first reference distance in the horizontal direction from a first reference point of the road end line to the division line;
calculate a second reference distance in the horizontal direction from a second reference point of the road end line to the division line;
calculate the constant ratio on the basis of a ratio of a difference between the first reference distance and the second reference distance with respect to a distance in the vertical direction from the first reference point to the second reference point, and
estimate the extended portion of the division line on the basis of the calculated candidate points of the division lines.

12. The travel assistance device according to claim 9,
wherein the digital signal processor further configured to:
detect a plurality of candidate points indicating the road end line, and approximate the road end line as a polynomial curve on the basis of the plurality of detected candidate points, and
approximate the division line as a polynomial curve on the basis of the candidate points of the division line.

13. The travel assistance device according to claim 9,
wherein the digital signal processor further configured to generate a display image indicating the division line, the extended portion of the division line, and the road end line, and
the travel assistance device further comprises a controller which displays the generated display image on a display screen.

14. The travel assistance device according to claim 9, further comprising:
a controller configured to present a warning for a driver of the vehicle,
wherein the digital signal processing unit further configured to:

set a travel lane area of the road in which the vehicle travels, on the basis of the division line, the extended portion of the division line, and the road end line;
detect an isothermal object from the infrared image; and
determine presence or absence of the object in the travel lane area and causes the controller to present a warning in a case where there is the object.

15. The travel assistance device according to claim 14, wherein the digital signal processing unit further configured to:
    estimate an entrance time at which the object enters the travel lane area on the basis of a distance between the travel lane area and the object and a movement speed of the object,
    estimate an arrival time at which the vehicle arrives at the position of the object on the basis of a distance between the object and the vehicle and a movement speed of the vehicle, and
    cause the controller to present a warning in a case where the entrance time is before the arrival time.

16. The travel assistance device according to claim 9, wherein the digital signal processor further configured to set a travel lane area of the road in which the vehicle travels, on the basis of the division line, the extended portion of the division line, and the road end line; and
    the travel assistance device further comprises a controller configured to perform an exposure correction process for the visible image on the basis of pixel values of the travel lane area in the visible image.

17. The travel assistance device according to claim 9, further comprising:
    wherein the digital signal processor further configured to set a travel lane area of the road in which the vehicle travels, on the basis of the division line, the extended portion of the division line, and the road end line; and
    the travel assistance device further comprises a controller configured to perform exposure control of the visible imaging unit on the basis of pixel values of the travel lane area in the visible image.

18. A travel assistance method that is performed by a travel assistance device, the travel assistance method comprising:
    an infrared imaging step of obtaining an infrared image in front of a vehicle from an infrared imaging unit that is mounted on the vehicle;
    a visible imaging step of obtaining a visible image in a range corresponding to a range indicated by the infrared image from a visible imaging unit that is mounted on the vehicle;
    a road detection step of detecting a road end line of a road on which the vehicle travels from the obtained infrared image;
    a division line detection step of detecting a division line of the road from the obtained visible image;
    an image generation step of generating an integrated image indicating the road end line and the division line on the basis of the infrared image and the visible image registered with each other; and
    a division line estimation step of estimating an extended portion of the division line in the integrated image on the basis of the division line and the road end line in the integrated image,
    wherein the method further comprises the steps of:
        generating a first integrated image which is a two-dimensional image indicating the road end line and the division line as the integrated image on the basis of the infrared image and the visible image registered with each other;
        calculating an internal division ratio at which a reference point on one of two road end lines and a reference point on the other of the two road end lines are internally divided by a reference point on the division line on a line extending in a horizontal direction of the integrated image in a state in which the integrated image is arranged with a downward direction of the vehicle set as a downward direction of the image in a case where the two road end lines respectively indicating both ends of the road are detected; and
        calculating respective candidate points of the division lines according to a condition that a point on the one road end line, a point on the other road end line, and a point on the division line maintain the internal division ratio on a line extending in the horizontal direction passing through each point from each reference point to an intersection point of the two road end lines; and
        estimating the extended portion of the division line on the basis of the calculated candidate points of the division lines.

19. A travel assistance method that is performed by a travel assistance device, the travel assistance method comprising:
    an infrared imaging step of obtaining an infrared image in front of a vehicle from an infrared imaging unit that is mounted on the vehicle;
    a visible imaging step of obtaining a visible image in a range corresponding to a range indicated by the infrared image from a visible imaging unit that is mounted on the vehicle;
    a road detection step of detecting a road end line of a road on which the vehicle travels from the obtained infrared image;
    a division line detection step of detecting a division line of the road from the obtained visible image;
    an image generation step of generating an integrated image indicating the road end line and the division line on the basis of the infrared image and the visible image registered with each other; and
    a division line estimation step of estimating an extended portion of the division line in the integrated image on the basis of the division line and the road end line in the integrated image,
    wherein the method further comprises the steps of:
        generating a second integrated image which is a two-dimensional image indicating the road end line and the division line as the integrated image on the basis of the infrared image and the visible image registered with each other;
        calculating respective candidate points of the division lines corresponding to the respective points of the road end lines according to a condition that a distance in the horizontal direction between the road end line and the division line increases at a constant ratio as a distance in a vertical direction from an upper end of the road end line increases in the integrated image in a state in which the integrated image is arranged with a downward direction of the vehicle set as a downward direction of the image; and estimating the extended portion of the division line on the basis of the calculated candidate points of the division lines.

\* \* \* \* \*